United States Patent
Harada et al.

(10) Patent No.: US 11,610,544 B2
(45) Date of Patent: *Mar. 21, 2023

(54) TOUCH PANEL SYSTEM, ELECTRONIC DEVICE, AND SEMICONDUCTOR DEVICE HAVING A NEURAL NETWORK

(71) Applicant: SEMICONDUCTOR ENERGY LABORATORY CO., LTD., Atsugi (JP)

(72) Inventors: Shintaro Harada, Shizuoka (JP); Yoshiyuki Kurokawa, Kanagawa (JP); Takeshi Aoki, Kanagawa (JP); Yuki Okamoto, Kanagawa (JP); Hiroki Inoue, Kanagawa (JP); Koji Kusunoki, Kanagawa (JP); Yosuke Tsukamoto, Kanagawa (JP); Katsuki Yanagawa, Kanagawa (JP); Kei Takahashi, Kanagawa (JP); Shunpei Yamazaki, Tokyo (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,696

(22) Filed: Dec. 9, 2021

(65) Prior Publication Data

US 2022/0172677 A1 Jun. 2, 2022

Related U.S. Application Data

(63) Continuation of application No. 16/489,716, filed as application No. PCT/IB2018/051174 on Feb. 26, 2018, now Pat. No. 11,227,543.

(30) Foreign Application Priority Data

Mar. 10, 2017 (JP) .............................. JP2017-045618
Mar. 10, 2017 (JP) .............................. JP2017-045685
Jun. 26, 2017 (JP) .............................. JP2017-123951

(51) Int. Cl.
   *G09G 3/3225* (2016.01)
   *G06F 1/16* (2006.01)
   (Continued)

(52) U.S. Cl.
   CPC ......... *G09G 3/3225* (2013.01); *G06F 1/1618* (2013.01); *G06F 1/1652* (2013.01);
   (Continued)

(58) Field of Classification Search
   CPC ...... G09G 3/3225; G09G 5/22; G09G 3/3648; G09G 2354/00; G09G 2380/02;
   (Continued)

(56) References Cited

U.S. PATENT DOCUMENTS

| 5,328,861 A | 7/1994 | Miyakawa |
| 5,336,936 A * | 8/1994 | Allen .................... G06N 3/0635 365/45 |

(Continued)

FOREIGN PATENT DOCUMENTS

| JP | 03-163684 A | 7/1991 |
| JP | 2005-182785 A | 7/2005 |

(Continued)

OTHER PUBLICATIONS

International Search Report (Application No. PCT/IB2018/051174) dated Apr. 10, 2018.
(Continued)

*Primary Examiner* — Richard J Hong
(74) *Attorney, Agent, or Firm* — Nixon Peabody LLP; Jeffrey L. Costellia

(57) ABSTRACT

An electronic device capable of efficiently recognizing a handwritten character is provided.
The electronic device includes a first circuit, a display portion, and a touch sensor. The first circuit includes a neural
(Continued)

network. The display portion includes a flexible display. The touch sensor has the function of outputting an input handwritten character as image information to the first circuit. The first circuit has the function of analyzing the image information and converting the image information into character information, and a function of displaying an image including the character information on the display portion. The analysis is performed by inference through the use of the neural network.

10 Claims, 26 Drawing Sheets

(51) Int. Cl.
  *G06F 3/041* (2006.01)
  *G06N 3/04* (2023.01)
  *G06N 3/08* (2023.01)
  *G09G 5/22* (2006.01)
  *G06V 30/32* (2022.01)
  *G09G 3/36* (2006.01)

(52) U.S. Cl.
  CPC ............ *G06F 1/1681* (2013.01); *G06F 3/041* (2013.01); *G06N 3/04* (2013.01); *G06N 3/08* (2013.01); *G06V 30/32* (2022.01); *G09G 5/22* (2013.01); *G06F 2203/04102* (2013.01); *G09G 3/3648* (2013.01); *G09G 2354/00* (2013.01); *G09G 2380/02* (2013.01)

(58) Field of Classification Search
  CPC ..... G06V 30/32; G06F 1/1618; G06F 1/1652; G06F 1/1681; G06F 3/041; G06F 2203/04102; G06N 3/04; G06N 3/08; G06N 3/0635; G06N 3/10; G06N 3/063; G11C 11/54; G11C 13/0002; H01L 29/512
  See application file for complete search history.

(56) References Cited

U.S. PATENT DOCUMENTS

| | | | |
|---|---|---|---|
| 5,621,863 A | 4/1997 | Boulet et al. | |
| 7,219,085 B2 | 5/2007 | Buck et al. | |
| 7,548,892 B2 | 6/2009 | Buck et al. | |
| 9,719,665 B2 | 8/2017 | Hirakata et al. | |
| 9,753,495 B2 | 9/2017 | Matsumoto | |
| 9,779,653 B2 | 10/2017 | Ikeda et al. | |
| 9,805,659 B2 | 10/2017 | Ikeda et al. | |
| 10,141,069 B2 | 11/2018 | Ikeda et al. | |
| 2010/0223220 A1* | 9/2010 | Modha | G06N 3/0635 706/33 |
| 2011/0169813 A1 | 7/2011 | Jin et al. | |
| 2013/0216126 A1 | 8/2013 | Chen | |
| 2014/0258194 A1* | 9/2014 | Towal | G06N 3/10 706/26 |
| 2014/0310220 A1* | 10/2014 | Chang | G06N 3/08 706/25 |
| 2015/0016126 A1 | 1/2015 | Hirakata et al. | |
| 2015/0028278 A1* | 1/2015 | Lee | H01L 29/512 257/2 |
| 2015/0036920 A1 | 2/2015 | Wu et al. | |
| 2015/0062525 A1 | 3/2015 | Hirakata | |
| 2015/0103023 A1 | 4/2015 | Iwaki | |
| 2016/0104411 A1 | 4/2016 | Nathan et al. | |
| 2016/0109972 A1 | 4/2016 | Hyde | |
| 2016/0139472 A1 | 5/2016 | Lee et al. | |
| 2016/0155049 A1 | 6/2016 | Choi | |
| 2016/0343452 A1 | 11/2016 | Ikeda et al. | |
| 2016/0349558 A1 | 12/2016 | Shishido et al. | |
| 2017/0052566 A1 | 2/2017 | Ka et al. | |
| 2017/0083811 A1* | 3/2017 | Cho | G11C 13/0002 |
| 2017/0084619 A1* | 3/2017 | Wenxu | G11C 11/54 |
| 2017/0084639 A1 | 3/2017 | Kao et al. | |
| 2017/0364790 A1* | 12/2017 | Leobandung | G06N 3/063 |
| 2018/0006129 A1 | 1/2018 | Xing et al. | |
| 2018/0061868 A1 | 3/2018 | Na et al. | |
| 2019/0164620 A1 | 5/2019 | Ikeda et al. | |

FOREIGN PATENT DOCUMENTS

| | | |
|---|---|---|
| JP | 2015-097083 A | 5/2015 |
| JP | 2016-219011 A | 12/2016 |
| JP | 2016-224935 A | 12/2016 |
| KR | 2016-0140430 A | 12/2016 |
| WO | WO-2016/189432 | 12/2016 |

OTHER PUBLICATIONS

Written Opinion (Application No. PCT/IB2018/051174) dated Apr. 10, 2018.

* cited by examiner

FIG. 7
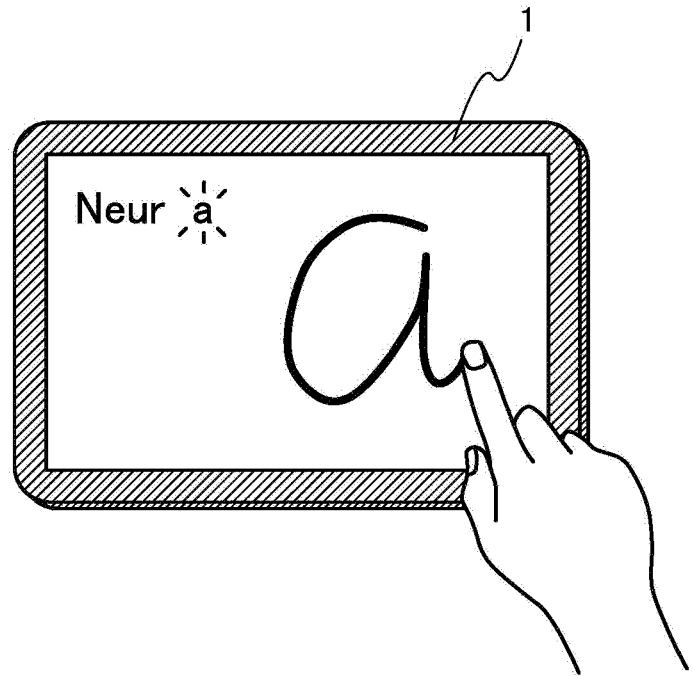
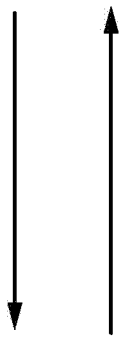
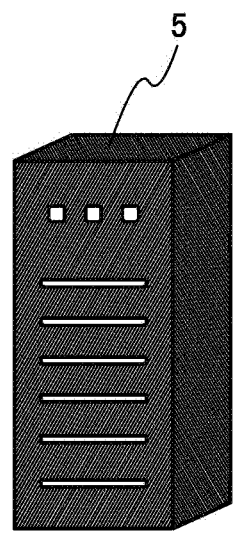

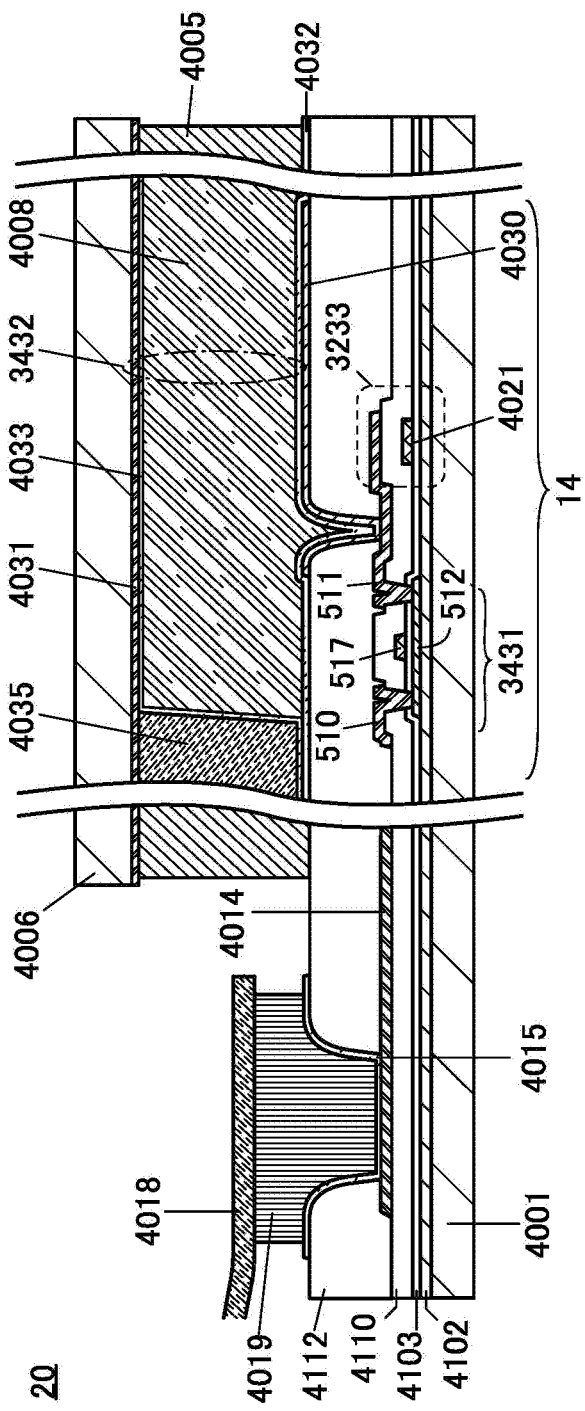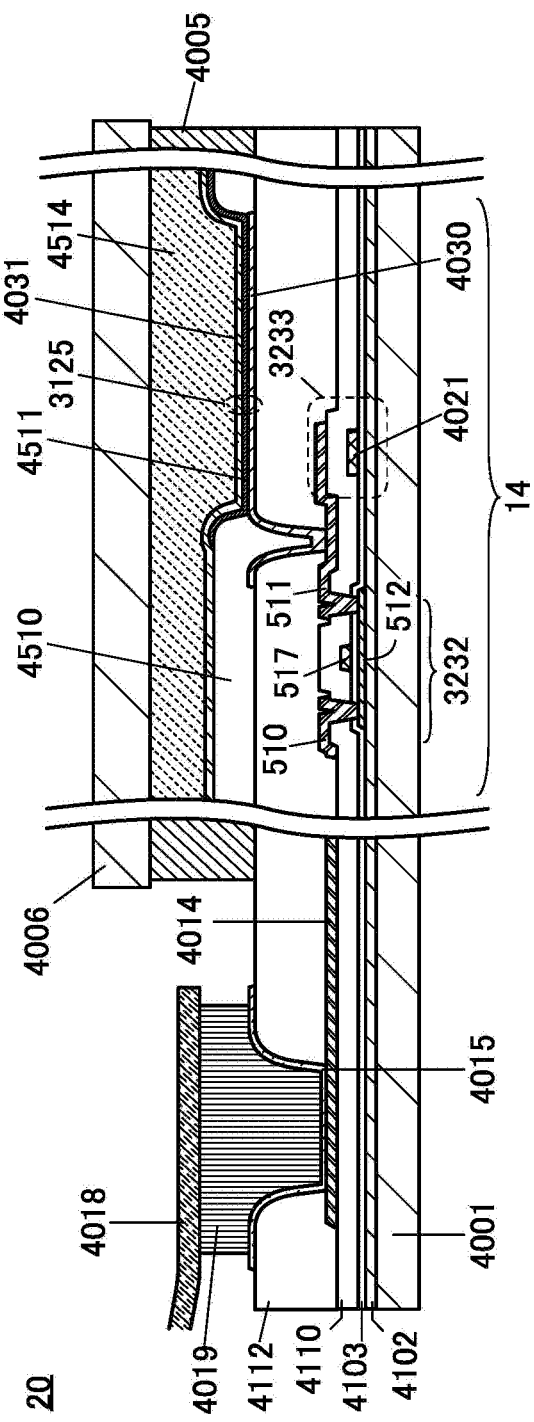

FIG. 25A
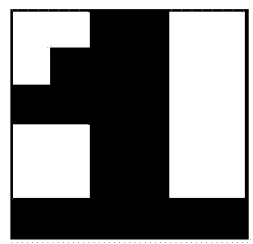
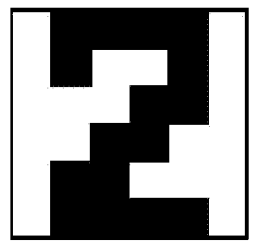
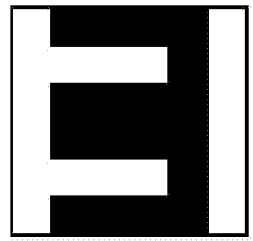
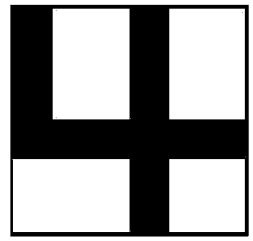
FIG. 25B
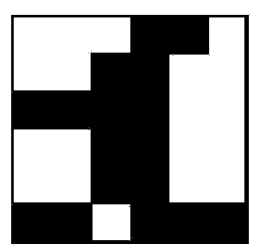 ⇨ 99%
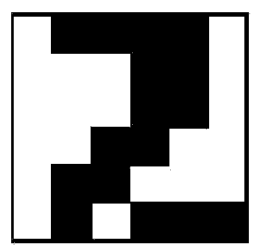 ⇨ 97%
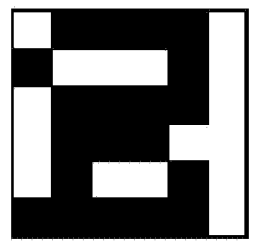 ⇨ 96%
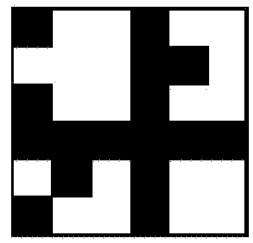 ⇨ 99%

TOUCH PANEL SYSTEM, ELECTRONIC DEVICE, AND SEMICONDUCTOR DEVICE HAVING A NEURAL NETWORK

TECHNICAL FIELD

One embodiment of the present invention relates to a touch panel system and an electronic device using the touch panel system.

Another embodiment of the present invention relates to a semiconductor device.

Note that in this specification and the like, a semiconductor device generally means a device that can function by utilizing semiconductor characteristics. A display device, a light-emitting device, a memory device, an electro-optical device, an electric storage device, a semiconductor circuit, and an electronic device include a semiconductor device in some cases.

Note that one embodiment of the present invention is not limited to the above technical field. The technical field of the invention disclosed in this specification and the like relates to an object, a method, or a manufacturing method. One embodiment of the present invention also relates to a process, a machine, manufacture, or a composition of matter.

BACKGROUND ART

In recent years, machine learning techniques such as an artificial neural network (hereinafter referred to as a neural network) have been actively developed, and successful examples have been reported mainly in the field of image recognition.

Patent Document 1 discloses an example in which machine learning through a neural network is performed with the use of a processor such as a CPU (Central Processing Unit) or a GPU (Graphics Processing Unit) and handwritten character recognition is performed.

Furthermore, in recent years, transistors using oxide semiconductors or metal oxides in their channel formation regions (Oxide Semiconductor transistors, hereinafter referred to as OS transistors) have attracted attention. The off-state current of an OS transistor is extremely low. Applications that employ OS transistors to utilize their extremely low off-state currents have been proposed. For example, Patent Document 2 discloses an example in which an OS transistor is used for learning in a neural network.

REFERENCE

Patent Documents

[Patent Document 1] Japanese Published Patent Application No. 2005-182785
[Patent Document 2] Japanese Published Patent Application No. 2016-219011

SUMMARY OF THE INVENTION

Problems to be Solved by the Invention

Machine learning through a neural network requires a huge amount of calculation. Thus, in the case where a neural network is formed with the use of a digital circuit such as a CPU or a GPU, a huge number of transistors are required, which is inefficient and results in high power consumption.

An object of one embodiment of the present invention is to provide a touch panel system capable of efficiently recognizing handwritten characters. Another object of one embodiment of the present invention is to provide a semiconductor device capable of efficiently forming a neural network. Another object of one embodiment of the present invention is to provide a semiconductor device capable of efficiently performing product-sum operations. Another object of one embodiment of the present invention is to provide a semiconductor device capable of performing product-sum operations with high accuracy. Another object of one embodiment of the present invention is to provide a novel semiconductor device.

Another object of one embodiment of the present invention is to provide an electronic device capable of efficiently recognizing handwritten characters. Another object is to provide an electronic device which is capable of recognizing handwritten characters and includes a flexible display portion. Another object is to provide an electronic device capable of recognizing handwritten characters and achieving both portability and high browsability.

Note that description of more than one objects does not preclude the existence of each other. Note that one embodiment of the present invention need not necessarily achieve all of these objects. Objects other than those listed above become apparent from the description of the specification, the drawings, the claims, and the like, and such objects could be objects of one embodiment of the present invention.

Means for Solving the Problems

One embodiment of the present invention is an electronic device including a first circuit, a display portion, and a touch sensor. The first circuit includes a neural network. The display portion includes a flexible display. The touch sensor has the function of outputting a handwritten character that is input, as image information, to the first circuit. In addition, the first circuit has the function of analyzing the image information and converting the image information into character information, and a function of displaying an image including the character information on the display portion; and the analysis is performed by inference through the use of a neural network.

In the above, the electronic device preferably includes a first housing, a second housing, a third housing, and a plurality of hinges. Here, the flexible display preferably includes a portion held by the first housing, a portion held by the second housing, and a portion held by the third housing. In addition, the first housing, the second housing, and the third housing are preferably joined by the hinges so that the flexible display can be changed in shape reversibly between an opened state and a three-folded state.

Furthermore, in the above, the first circuit preferably includes a memory capable of retaining analog data.

Furthermore, in the above, the first circuit preferably includes a transistor including a metal oxide in a channel formation region.

Effects of the Invention

According to one embodiment of the present invention, a touch panel system capable of efficiently recognizing handwritten characters can be provided. According to one embodiment of the present invention, a semiconductor device capable of efficiently forming a neural network can be provided. Furthermore, according to one embodiment of the present invention, a semiconductor device capable of efficiently performing product-sum operations can be provided. Furthermore, according to one embodiment of the present invention, a semiconductor device capable of performing product-sum operations with high accuracy can be provided. Furthermore, according to one embodiment of the present invention, a novel semiconductor device can be provided.

Furthermore, according to one embodiment of the present invention, an electronic device capable of efficiently recognizing handwritten characters can be provided. An electronic device including a flexible display portion and capable of recognizing handwritten characters can also be provided. An electronic device capable of recognizing handwritten characters and achieving both portability and high browsability can also be provided.

Note that the description of these effects do not preclude the existence of other effects. Note that one embodiment of the present invention does not have to have all of these effects. Note that effects other than these effects will be apparent and can be derived from the description of the specification, the drawings, the claims, and the like.

BRIEF DESCRIPTION OF THE DRAWINGS

FIG. 7 is an external view of an information terminal and a server.

FIGS. 21A and 21B are cross-sectional views each illustrating a structure example of a display panel.

FIGS. 25A and 25B are simulation results of the case where a neural network is formed using the OS-APS fabricated as a prototype in Example 1.

MODES FOR CARRYING OUT THE INVENTION

Figure 1:
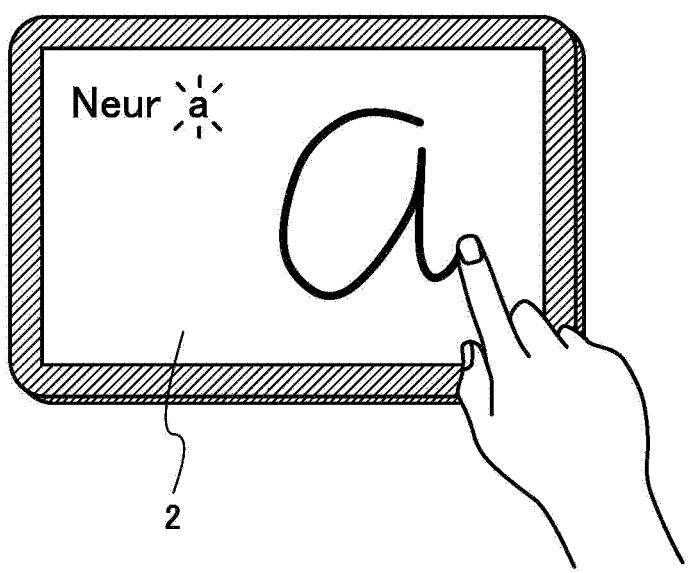
FIG. 1 is an example of an information terminal using a touch panel system.

Hereinafter, embodiments will be described with reference to drawings. Note that the embodiments can be implemented with many different modes, and it will be readily appreciated by those skilled in the art that modes and the details thereof can be changed in various ways without departing from the spirit and scope thereof. Thus, the present invention should not be interpreted as being limited to the following description of the embodiments.

In the drawings, the size, the layer thickness, or the region is exaggerated for clarity in some cases. Therefore, they are not necessarily limited to the illustrated scale. Note that the drawings schematically show ideal examples, and shapes, values or the like are not limited to shapes, values or the like shown in the drawings.

Furthermore, in this specification, the embodiments described below can be combined as appropriate. In addition, in the case where a plurality of structure examples are described in one embodiment, the structure examples can be combined with each other as appropriate.

Note that in this specification and the like, a neural network refers to a general model having the capability of solving problems, which is modeled on a biological neural network and determines the connection strength of neurons by learning. The neural network includes an input layer, a middle layer (also referred to as a hidden layer), and an output layer.

In addition, in the description of the neural network in this specification, to determine the connection strength of neurons (also referred to as a weight coefficient) from the existing information is referred to as "learning" in some cases.

Moreover, in this specification, to draw a new conclusion from the neural network formed using the connection strength obtained by the learning is referred to as "inference" in some cases.

Embodiment 1

In this embodiment, a touch panel system which is one embodiment of the present invention and an electronic device using the touch panel system will be described. Note that in this embodiment, an information terminal will be described as an example of the electronic device.

FIG. 1 is an external view illustrating a usage example of an information terminal 1. The information terminal 1 includes a display portion 2. The display portion 2 also has the function of an input portion.

The information terminal 1 is capable of recognizing characters that are input to the display portion 2, and displaying the results of recognition. FIG. 1 illustrates an example in which a user inputs an alphabet "a" with his or her finger, the information terminal 1 recognizes the character that is input, and the result of recognition ("a" of "Neura", for example) is displayed on the upper left of the display portion 2. Note that the input of characters in the display portion 2 can be performed not only with the finger but also with a stylus pen or the like.

Figure 2A:
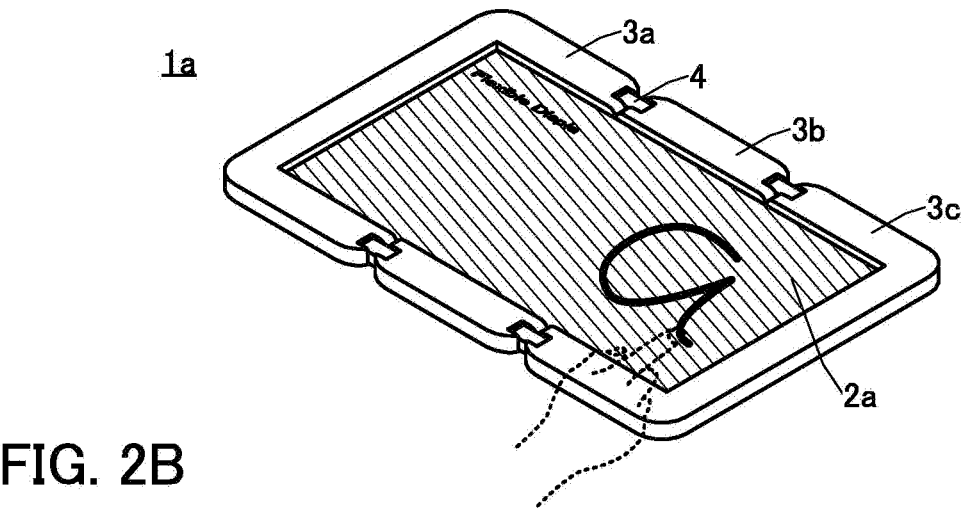
FIGS. 2A to 2C are examples of an information terminal using a touch panel system.
Figure 2B:
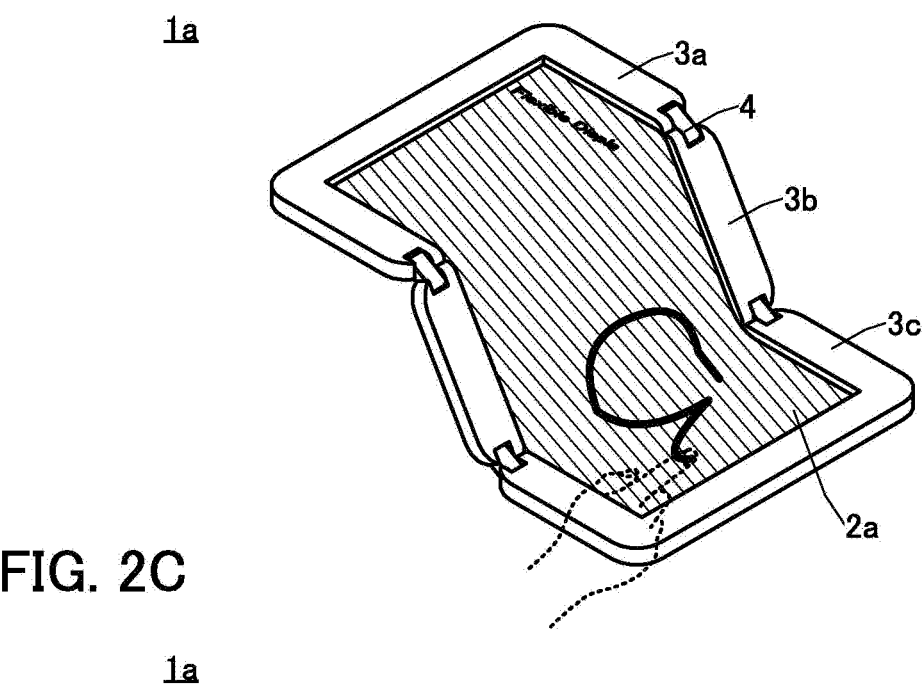
Figure 2C:
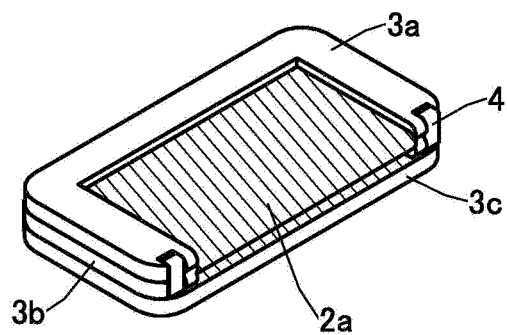

A flexible display can also be used as a display portion provided in the information terminal. FIGS. 2(A), 2(B), and 2(C) illustrate an information terminal 1a which uses a flexible display.

The information terminal 1a includes three housings (a housing 3a, a housing 3b, and a housing 3c) and a display portion 2a. The display portion 2a includes a flexible display, and includes three portions respectively held by the three housings. In addition, the housing 3a and the housing 3b, and the housing 3b and the housing 3c are connected to each other by hinges 4 such that they can rotate around the hinges 4.

The information terminal 1a can be changed in shape reversibly from the state in which the display portion 2a is opened as illustrated in FIG. 2(A) to the state in which the display portion 2a is three-folded as illustrated in FIG. 2(C). FIG. 2(B) illustrates a state between the two states.

The information terminal 1a in the state where the display portion 2a is opened is highly browsable, enabling a handwritten character ("a" of "Flexible Displa" in the drawing) to be input to or displayed on its seamless, wide display region. Furthermore, the information terminal can be small when the display portion 2a is folded in three, and is highly portable.

FIG. 2(B) illustrates the case where a handwritten character ("a" of "Flexible Displa") is input to the display portion 1a which is curved. In this case, the character may be distorted when the character is input across the curved portion. However, the use of the touch panel system which is described later makes it possible to efficiently recognize such a distorted character that is input.

When a user inputs a handwritten character, the speed of sliding his or her finger or the stylus varies from user to user. Furthermore, there is such user-to-user variation not only when handwritten characters are input, but also when a touch operation is performed. However, the use of the touch panel system which is described later allows effective recognition even when the sliding speed varies from user to user.

Figure 3:
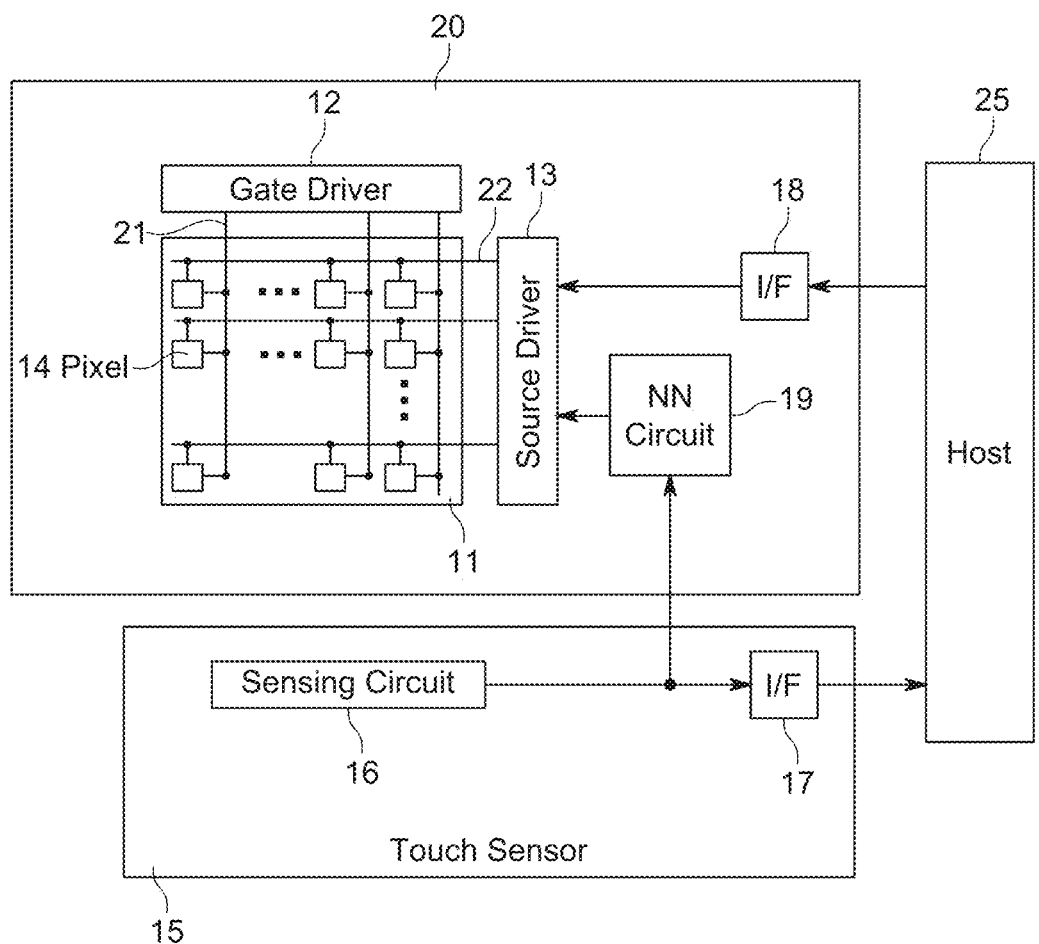
FIG. 3 is a block diagram illustrating a configuration example of a touch panel system.

FIG. 3 is a block diagram illustrating a configuration example of a touch panel system 10 used for the information terminal 1 and the information terminal 1a. The touch panel system 10 includes a display panel 20, a touch sensor 15, and a host 25.

The display panel 20 includes a pixel portion 11, a gate driver 12, a source driver 13, gate lines 21, source lines 22, an I/F (interface) 18, and a NN (neural network) circuit 19. The pixel portion 11 includes a plurality of pixels 14 connected to any of the gate lines 21 and any of the source lines 22.

The touch sensor 15 includes a sensing circuit 16 and an I/F 17.

The host 25 includes a CPU (Central Processing Unit), and has the function of supplying image data to the source driver 13 through the I/F 18. Note that the host 25 may include a GPU (Graphics Processing Unit).

The NN circuit 19 can perform learning or inference through the use of a neural network. More specifically, the NN circuit 19 can perform learning or inference through the use of a deep neural network, a convolutional neural network, a recurrent neural network, an autoencoder, a deep Boltzmann machine, or a deep belief network.

Figure 4:
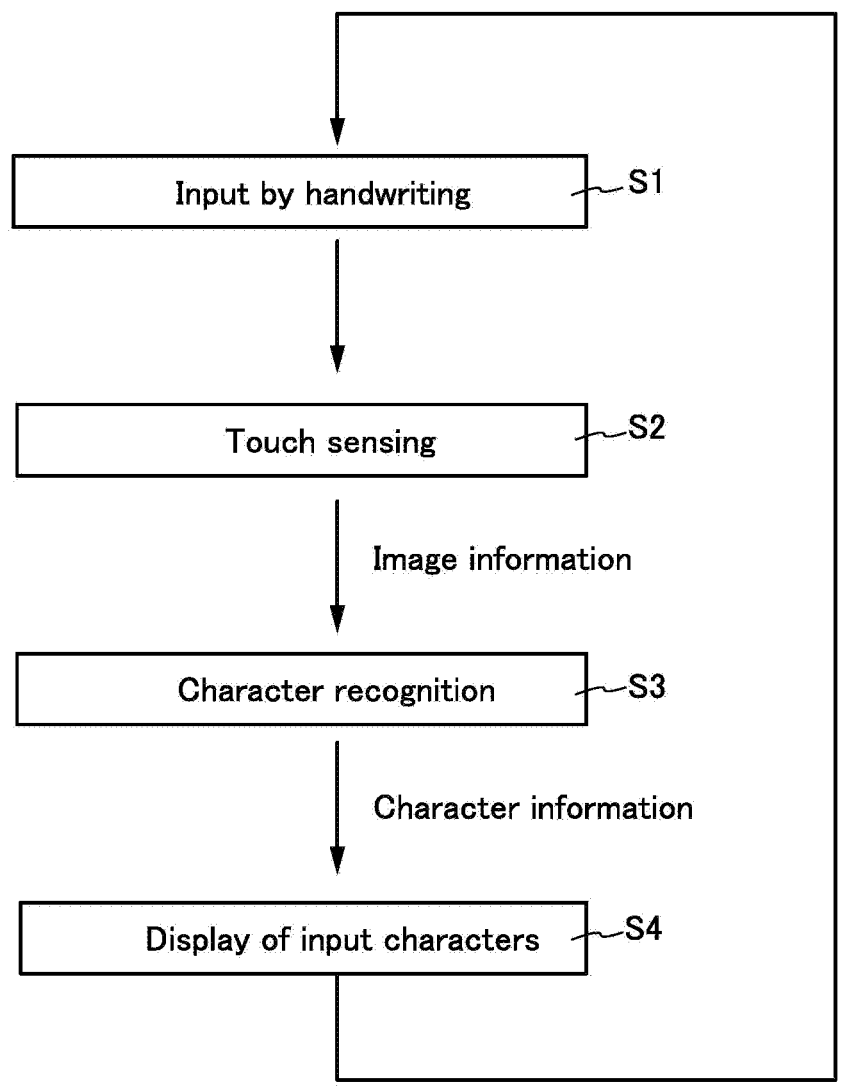
FIG. 4 is a flow chart showing the flow of data in a touch panel system.

Next, the process flow of the touch panel system 10 will be described with reference to the flow chart shown in FIG. 4.

First, a user inputs a handwritten character to the touch sensor 15 (Input by handwriting, Step S1).

The sensing circuit 16 senses the handwritten character (image information) that is input to the touch sensor 15, and transmits the information to the NN circuit 19. In addition, the sensing circuit 16 informs the host 25 through the I/F 17 of the fact that there has been a touch (Touch sensing, Step S2).

The NN circuit 19 analyzes the pattern of the image information, and converts the image information into character information (Character recognition, Step S3). The above analysis is performed by inference through the use of the neural network.

The NN circuit 19 outputs the character information to the source driver 13. The source driver 13 synthesizes the image data received from the host 25 and the character information received from the NN circuit 19, and performs display on the pixel portion 11 (Display of input characters, Step S4).

Figure 5:
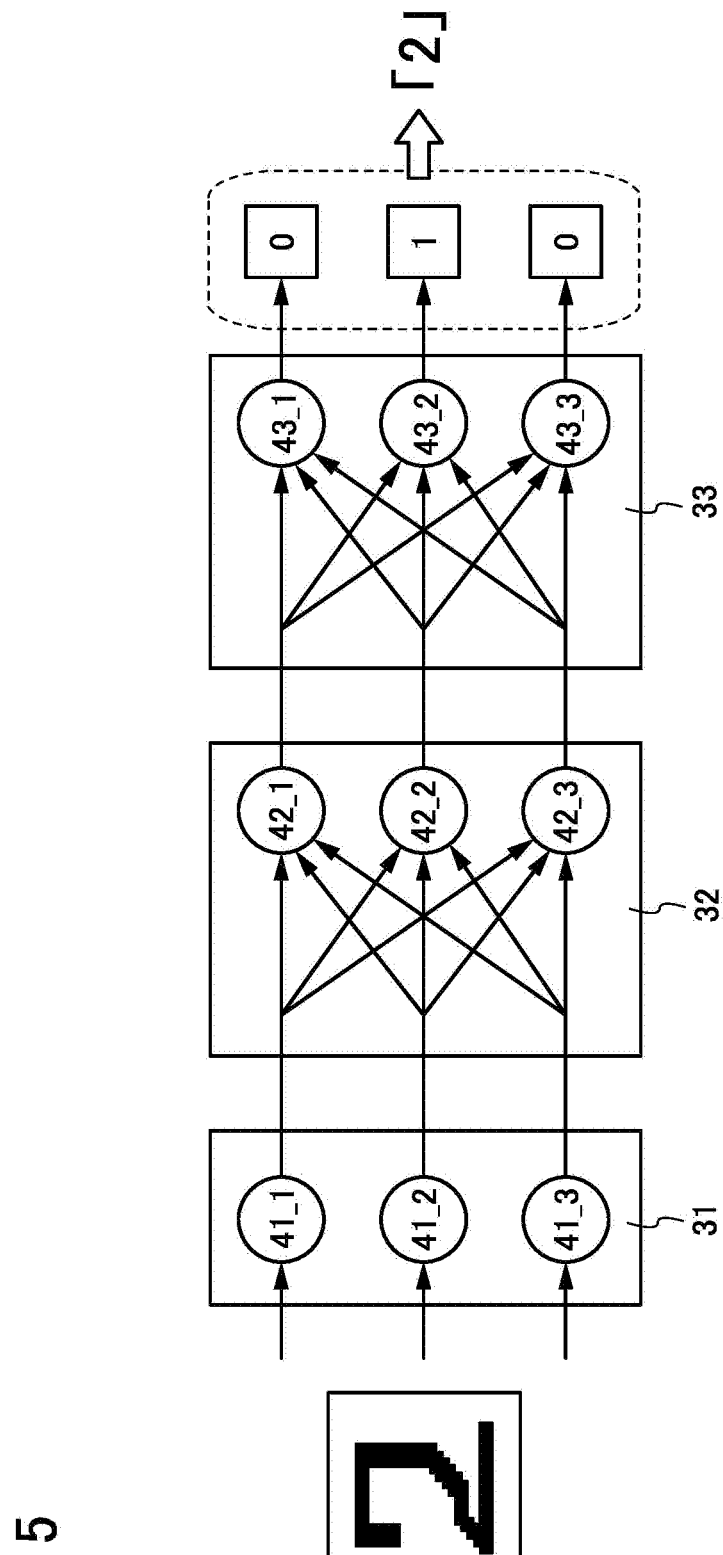
FIG. 5 is a conceptual diagram illustrating the flow of data in a neural network.

FIG. 5 is a conceptual diagram illustrating the data flow in the NN circuit 19. A neural network is formed in FIG. 5. The neural network illustrated in FIG. 5 includes an input layer 31, an intermediate layer 32, and an output layer 33. The input layer 31 includes neurons 41_1 to 41_3, the intermediate layer 32 includes neurons 42_1 to 42_3, and the output layer 33 includes neurons 43_1 to 43_3. Note that although the number of intermediate layers is one and the number of neurons in each layer is three in FIG. 5 for the sake of convenience, one embodiment is not limited thereto, and the number of intermediate layers and the number of neurons provided in the NN circuit 19 may depend on the problems to be treated.

The arithmetic processing in each layer is executed by the product-sum operation of an output of the neuron in the previous layer and a weight coefficient. When the output of an i-th neuron in the input layer is $x_i$ and the connection strength (weight coefficient) between the output $x_i$ and a j-th neuron in the intermediate layer is $w_{ji}$, for example, the output of the j-th neuron in the intermediate layer is $y_j = f(\Sigma w_{ji} \cdot x_i)$. Note that i and j are each an integer greater than or equal to 1. Here, f(x) represents an activation function; and a sigmoid function, a threshold function, or the like can be used therefor. In a similar manner, the output of the neuron in each layer is a value obtained from the activation function with respect to the result of product-sum operation of the output of the neuron in the previous layer and the weight coefficient. Furthermore, the connection between layers may be a full connection where all of the neurons are connected or a partial connection where some of the neurons are connected.

FIG. 5 illustrates an example in which image information indicating the numeral "2" is input to the input layer 31, and the classification result indicating "2" is output from the output layer 33.

The NN circuit 19 is preferably formed over the substrate over which the pixel portion 11 is formed, with the use of a technology such as TFT (Thin Film Transistor). In that case, the manufacturing cost of the NN circuit 19 can be reduced. Note that the details of the substrate that can be used for the display panel 20 will be described later in Embodiment 5.

It is also possible to form the NN circuit 19 with an IC chip, and set the IC chip on the display panel 20 with the use of a packaging technique such as COG (Chip On Glass), COF (Chip On Film), or TAB (Tape Automated Bonding). Note that the IC chip may include the source driver 13.

Although the NN circuit 19 may be included in the host 25 which exists outside the display panel 20, in that case, delay is caused between the display panel 20 and the host 25, which results in a time lag between when the touch sensor 15 receives an input and when the input result is displayed on the pixel portion 11 after passing through the host 25.

When the NN circuit 19 is formed on the display panel 20, the delay due to wiring resistance decreases and the readiness from input to display improves. Furthermore, the number of wirings is reduced, which lowers the power consumed by the touch panel system 10.

Figure 6:
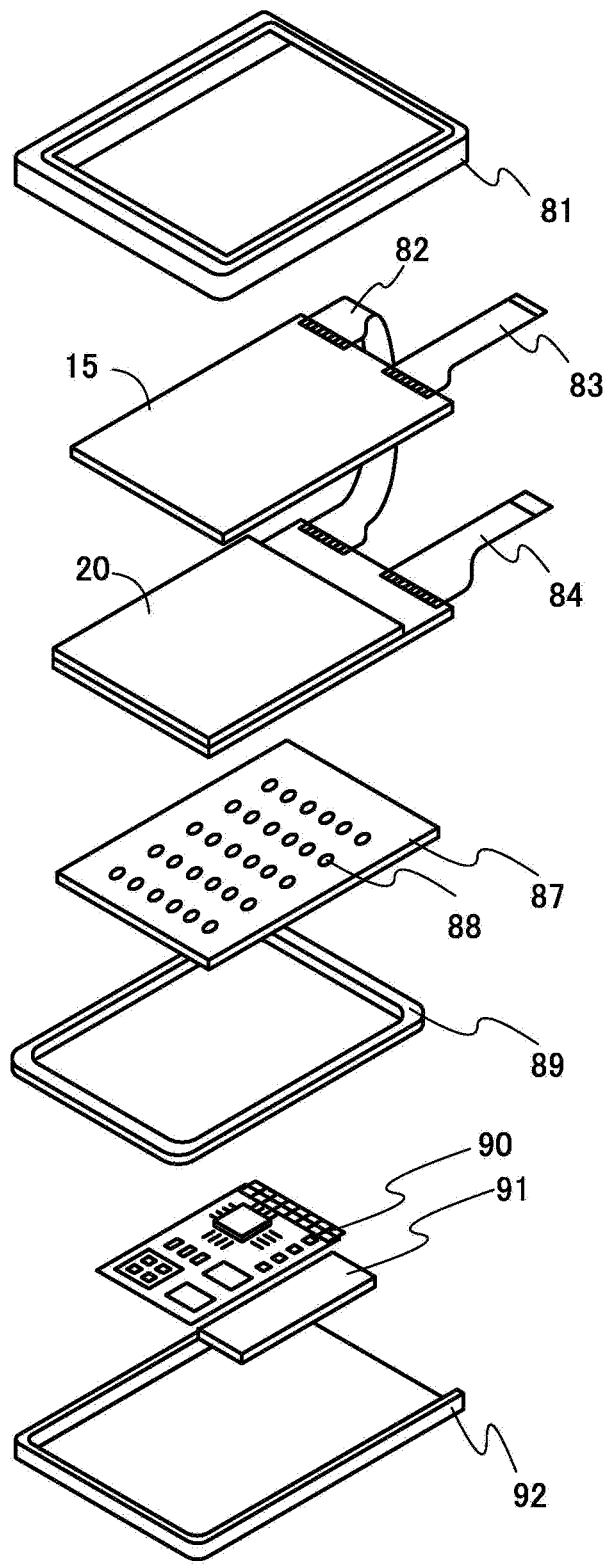
FIG. 6 is an example of a disassembled module of an information terminal.

FIG. 6 illustrates an example of a disassembled module of the information terminal 1. The information terminal 1 includes the touch sensor 15, the display panel 20, a backlight unit 87, a frame 89, a printed circuit board 90, and a battery 91 between an upper cover 81 and a lower cover 92.

The shapes and sizes of the upper cover 81 and the lower cover 92 can be changed as appropriate in accordance with the sizes of the touch sensor 15 and the display panel 20.

The backlight unit 87 includes a light source 88. A structure may be employed in which the light source 88 is provided at an end portion of the backlight unit 87 and a light diffusing plate is used. Note that the backlight unit 87 may be omitted in the case where a self-luminous display element such as an LED (Light Emitting Diode) or an organic EL (electroluminescence) is used in the display panel 20.

The frame 89 has the function of an electromagnetic shield for blocking electromagnetic waves generated by the operation of the printed circuit board 90, in addition to a function of protecting the display panel 20. The frame 89 may also have a function of a radiator plate.

Furthermore, the display module 1 may be additionally provided with a member such as a polarizing plate, a retardation plate, or a prism sheet.

The printed circuit board 90 includes a power supply circuit and a signal processing circuit for outputting a video signal and a clock signal. The host 25 illustrated in FIG. 3 is provided over the printed circuit board 90. The power source for supplying power to the power supply circuit may be an external commercial power source or may be a power source using the battery 91. The battery 91 can be omitted when a commercial power source is used.

The touch sensor 15 can be used overlapping the display panel 20. As the touch sensor 15, a resistive touch panel, a capacitive touch panel, or an optical touch panel can be used, for example.

When the display panel 20 has a touch sensor function, the touch sensor 15 illustrated in FIG. 6 can be included in the display panel 20. When a counter substrate (sealing substrate) of the display panel 20 has a touch panel function, for example, the touch sensor 15 can be included in the display panel 20. When an electrode for a touch sensor is provided in each pixel of the display panel 20, for example, the touch sensor 15 can be included in the display panel 20. When a photosensor is provided in each pixel of the display panel 20, for example, the touch sensor 15 can be included in the display panel 20.

The information terminal 1 may also be provided with an optical touch sensor, which is made up of a light-emitting portion, a light-guiding portion, and a light-receiving portion, around the display panel 20. In that case, the information terminal 1 senses a touch when light passing through the light-guiding portion is blocked by a finger.

In FIG. 6, an FPC (flexible printed circuit) 82 and an FPC 83 are connected to the touch sensor 15, and an FPC 82 and an FPC 84 are connected to the display panel 20. In addition, the FPC 83 and the FPC 84 are connected to the printed circuit board 90. The FPC 82 enables electrical connection between the touch sensor 15 and the display panel 20, the FPC 83 enables electrical connection between the touch sensor 15 and the printed circuit board 90, and the FPC 84 enables electrical connection between the display panel 20 and the printed circuit board 90. Note that in the case where the touch sensor 15 is included in the display panel 20, the FPC 82 is not necessary.

The neural network illustrated in FIG. 5 is executed by a huge number of product-sum operations. In the case where the arithmetic processing is performed by a digital circuit, a huge number of transistors are needed, resulting in inefficiency and high power consumption. Thus, the product-sum operations are preferably performed by an analog product-sum operation circuit (hereinafter referred to as APS (Analog Product-Sum circuit)). The APS preferably includes an analog memory. The APS stores a weight coefficient obtained by learning, in the analog memory, whereby the APS can perform the product-sum operations using analog data as it is. Consequently, the APS enables a neural network to be formed efficiently with a small number of transistors.

Note that, in this specification, an analog memory refers to a memory device that can store analog data. In addition, analog data refers to data having a resolution of three bits (eight levels) or more in this specification. Multilevel data is referred to as analog data in some cases.

As the analog memory, a multilevel flash memory, an ReRAM (Resistive Random Access Memory), an MRAM (Magnetoresistive Random Access Memory), or a memory using an OS transistor (hereinafter, OS memory) can be used.

It is preferable to use an OS memory, in particular, as the analog memory. An OS memory consumes less power data writing, compared with other nonvolatile memories such as a flash memory, an ReRAM, or an MRAM. Furthermore, unlike in a flash memory and an ReRAM, elements do not deteriorate in data writing, and there is no limitation on the number of times of data writing.

In this specification, an analog product-sum operation circuit including an OS memory is referred to as an OS-APS. Note that the details of an OS-APS will be described later in Embodiment 3 and Embodiment 4.

Learning by the neural network may be performed with the information terminal 1, with a large computer such as a dedicated server, or with a group of computers working in parallel and connected by a network like a cloud. Learning by the neural network, being large in calculation scale, is preferably performed with a large computer in particular. FIG. 7 illustrates an example in which learning is performed with a server 5. When a request is sent from the information terminal 1 to the server 5, the server 5 can transmit the weight coefficient determined by the learning to the information terminal 1. The information terminal 1 can perform inference through the use of the weight coefficient received from the server 5, and can display "a" of "Neura", for example.

The server 5 is preferably provided with software that can form the same neural network as that included in the NN circuit 19. In addition, the server preferably includes a processor with a high arithmetic processing capability. In that case, the information terminal 1 can receive the results of learning by the server 5 more efficiently.

As described above, with the use of the touch panel system described in this embodiment, a touch panel system capable of efficiently recognizing a handwritten character can be provided. In addition, an information terminal capable of efficiently recognizing a handwritten character can be provided.

Embodiment 2

In this embodiment, the touch panel system that is one embodiment of the present invention and an electronic device using the touch panel system will be described. Note that in this embodiment, an image-receiving device will be described as an example of an electronic device.

Figure 8:
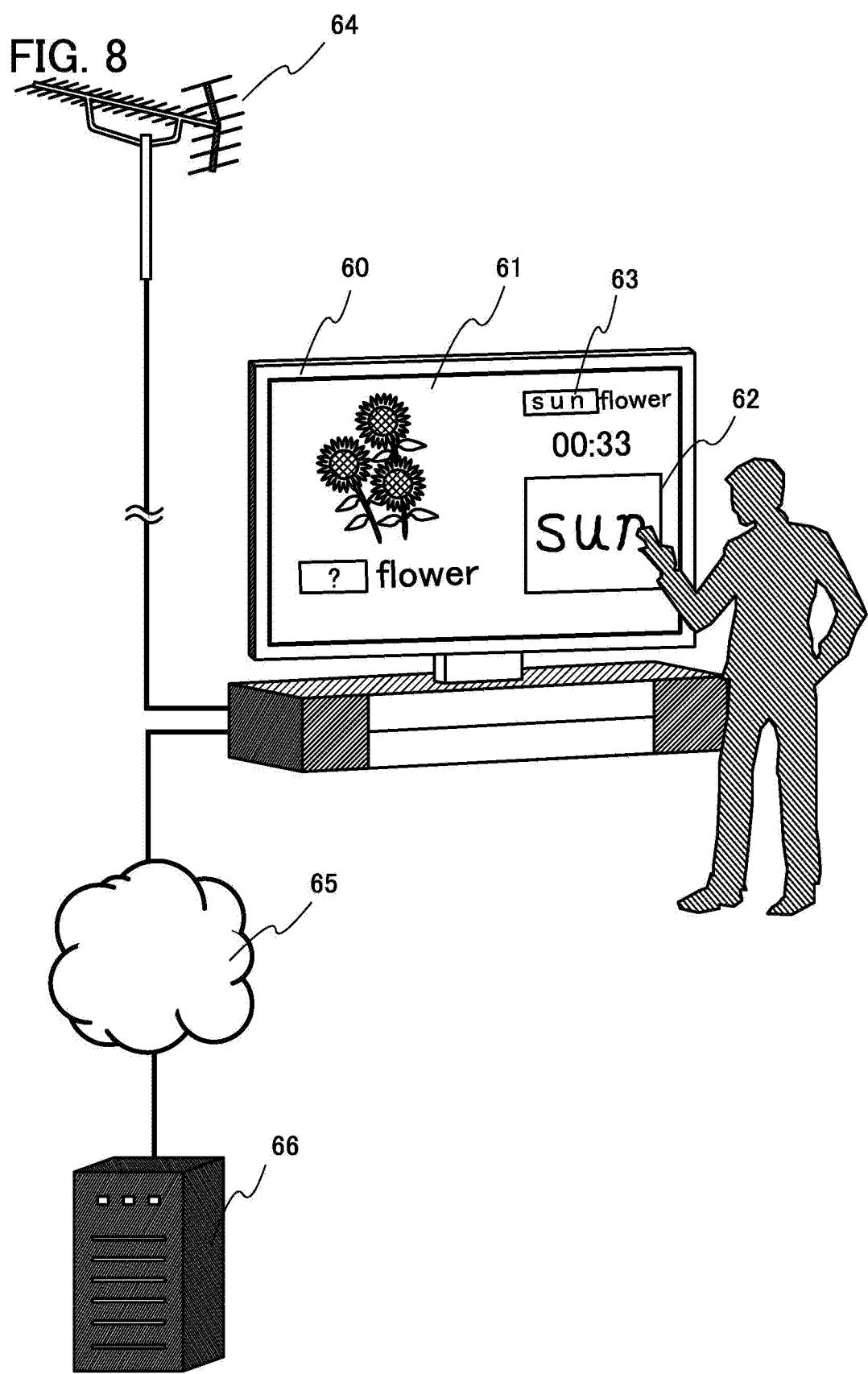
FIG. 8 is an example of an image-receiving device using a touch panel system.

FIG. 8 is an external view showing a specification example of an image-receiving device 60. The image-receiving device 60 is a television, and has the function of generating image data from a broadcast signal received by an antenna 64 and displaying an image.

Furthermore, the image-receiving device 60 can communicate with a server 66 of a broadcasting station via Internet connection 65.

Examples of the antenna 64 include a UHF (Ultra High Frequency) antenna, BS·110° CS antenna, and a CS antenna.

The image-receiving device 60 may communicate with the server 66 via a telephone line or the like instead of Internet connection.

The image-receiving device 60 includes a display portion 61, and the whole or a part of the display portion 61 functions as an input portion. A user can input information to the image-receiving device 60 by touching the display portion 61.

FIG. 8 illustrates the way the image-receiving device 60 displays an on-air quiz show. A question is displayed on the left side of the display portion 61, and the time limit and an input region 62 are displayed on the right side of the display portion 61. A user is required to input an answer in the input region 62 by handwriting within the time limit. In FIG. 8, the user is giving an answer, a word for the image of the flowers that comes before "flower". The image-receiving device 60 recognizes the handwritten characters (here, "sun") input by the user, and displays the result of recognition (here, "sun") in a region 63. After the time limit is up, the answer is transmitted to the server 66 of the broadcasting station via the Internet connection 65.

Figure 9:
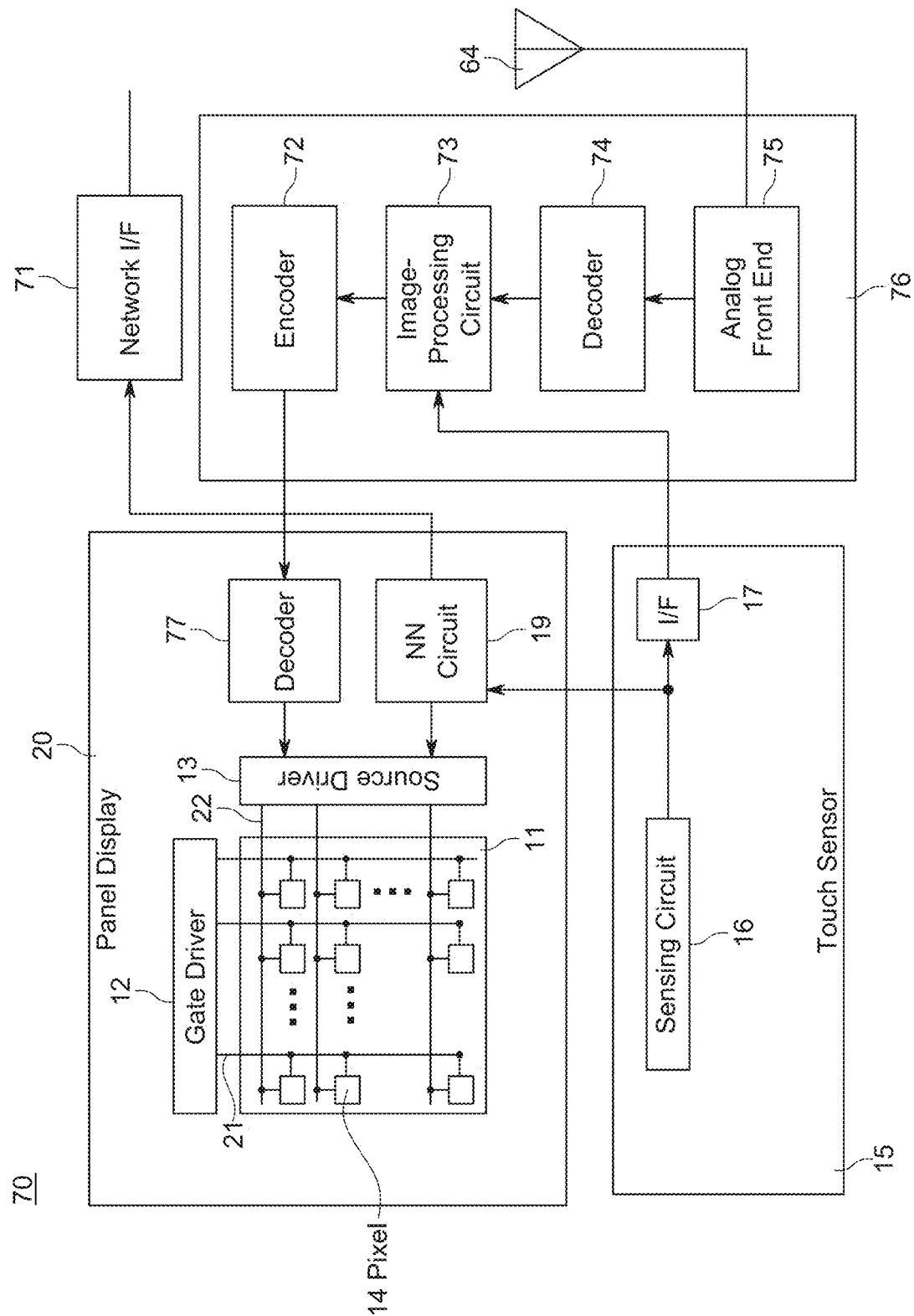
FIG. 9 is a block diagram illustrating a configuration example of a touch panel system.

FIG. 9 is a block diagram illustrating a configuration example of a touch panel system 70 used in the image-receiving device 60. The touch panel system 70 includes the display panel 20, the touch sensor 15, a receiving circuit 76, a network I/F 71, and the antenna 64.

The receiving circuit 76 includes an encoder 72, an image-processing circuit 73, a decoder 74, and an analog front end 75.

The analog front end 75 has the function of receiving a broadcast signal input from the antenna 64.

The decoder 74 has the function of decompressing the broadcast signal in accordance with the specifications of the broadcast standard and generating image data. Examples of the standard include H. 264 and H. 265.

The image-processing circuit 73 has the function of performing image processing on the decompressed image data. Image processing such as noise removal, correction of a seam between divided screens, correction of the color and definition of an image, correction of the dynamic range, improvement in sharpness of an image, and filtering is performed, for example. The image processing is preferably performed using a neural network. The image processing using a neural network allows the image-receiving device 60 to display an image that makes a user feel more natural.

The encoder 72 has the function of performing feature extraction from the image data that has been subjected to the image processing, and compressing the image data.

The display panel 20 includes a decoder 77. The decoder 77 is a decoder for the encoder 72, and has the function of decompressing the image data that has been compressed by the encoder 72.

The encoder 72 and the decoder 77 preferably constitute an autoencoder. The encoder 72 has the function of performing feature extraction from the image data with the use of a neural network, and compressing the image data. The decoder 77 has the function of decompressing the image data from the compressed data with the use of a neural network.

Image data decompressed by the decoder 77 is input to the source driver 13.

The display panel 20 and the receiving circuit 76 are electrically connected to each other with the use of a cable such as an FPC in many cases. In the case where the image-receiving device 60 deals with a large amount of data as in 8K (7680×4320) broadcasting, for example, an FPC that is capable of high-speed transmission is required; however, there is a limitation on the transmission speed of an FPC. Furthermore, as the size of the display panel increases, the physical distance between the receiving circuit 76 and the display panel 20 connected by a cable also increases, which results in greater loss in image data transmission.

Since the image-receiving device 60 includes the encoder 72 and the decoder 77, image data that has been compressed (with a small data size) can be transmitted from the receiving circuit 76 to the display panel 20. Thus, the image-receiving device 60 can transmit image data efficiently to the display panel 20 even when the resolution of the image data is high like 8K. In addition, when the data size is small, power required for the transmission is also small; thus, power consumed by the image-receiving device 60 can be reduced.

The network I/F 71 has the function of an I/F that connects the image-receiving device 60 and Internet connection.

As in the touch panel system 10 described in Embodiment 1, the NN circuit 19 in FIG. 9 can perform learning or inference through the use of a neural network. The NN circuit 19 analyzes the pattern of the image information input by the handwriting of a user, and converts the image information into character information. The above analysis is performed by inference through the use of the neural network.

The character information (the answer for the quiz in FIG. 8) is displayed by the pixel portion 11 through the source driver 13, and transmitted to the server of the broadcasting station via the network I/F.

As in the touch panel system 10 described in Embodiment 1, the NN circuit 19 in FIG. 9 particularly preferably includes an analog product-sum operation circuit (APS). The NN circuit 19 preferably includes an analog product-sum operation circuit including an OS memory (OS-APS). An OS-APS can perform product-sum operations processing efficiently with a small number of transistors. In addition, an OS-APS can perform product-sum operation processing with low power consumption.

Furthermore, a neural network can be formed with the use of an OS-APS also in the decoder 77, the encoder 72, and the image-processing circuit 73.

The decoder 74 performs product-sum operation processing such as discrete cosine transform when decompressing image data, and an OS-APS may be used for the product-sum operation processing.

For the details of the other components of the touch panel system 70, the description of the touch panel system 10 in Embodiment 1 can be referred to.

As described above, with the use of the touch panel system described in this embodiment, a touch panel system capable of efficiently recognizing a handwritten character can be provided. In addition, an image-receiving device capable of efficiently recognizing a handwritten character can be provided.

Embodiment 3

In this embodiment, an analog product-sum operation circuit that can be used for arithmetic operation of a neural network will be described.

Figure 10:
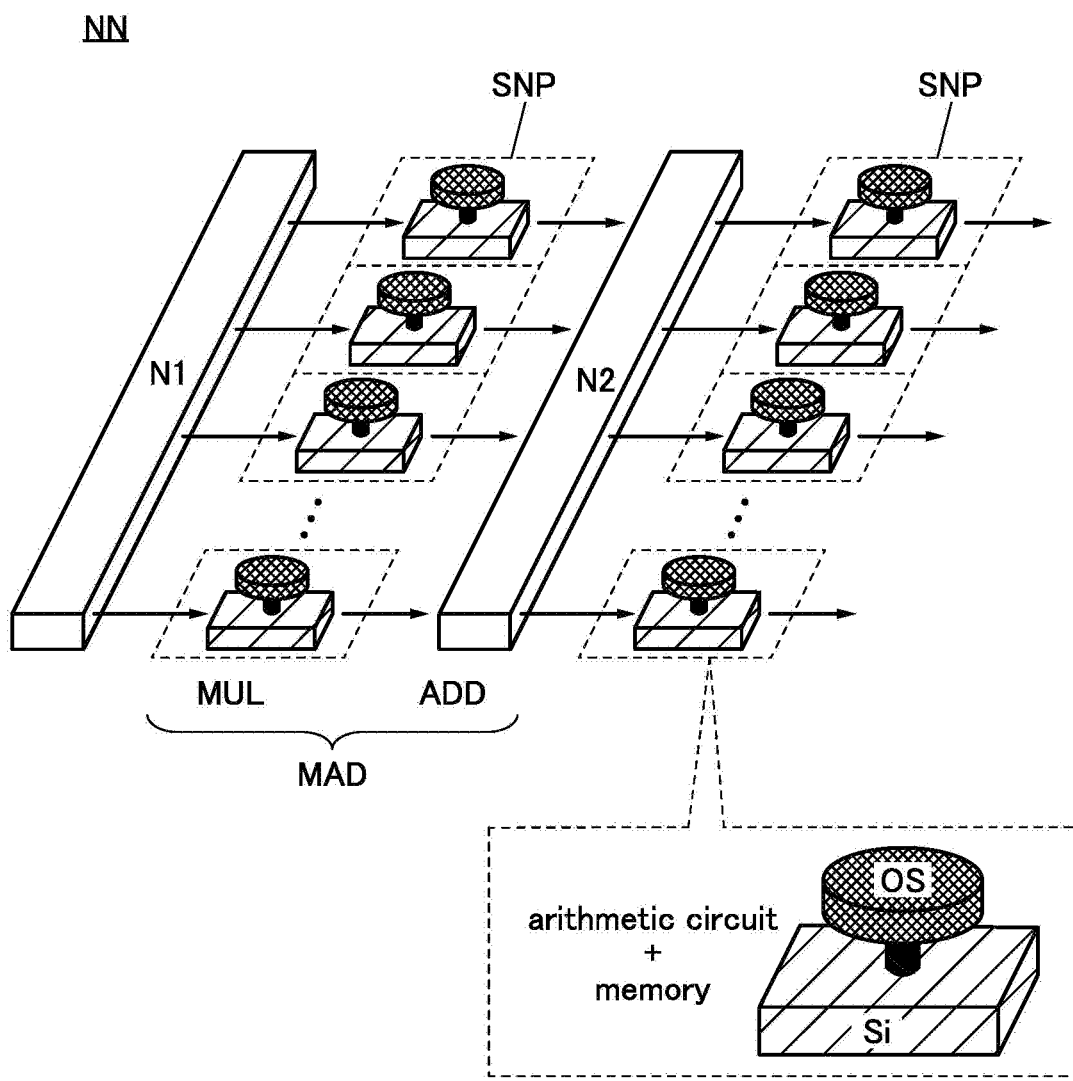
FIG. 10 is a schematic diagram of a neural network.

As mentioned above, the arithmetic operation of a neural network includes product-sum operations of the output of neurons and weight coefficients stored in synapses. FIG. 10 is a schematic diagram of a neural network.

The neural network NN illustrated in FIG. 10 includes neuron groups N1 and N2 each made up of a plurality of neurons and synapses SNP in which weight coefficients between neurons are stored. The neuron group N1 corresponds to an input layer or an intermediate layer, and the neuron group N2 corresponds to an intermediate layer or an output layer. A signal output from the neuron group N1 is input to the neuron group N2 via the synapse SNP.

Figure 11:
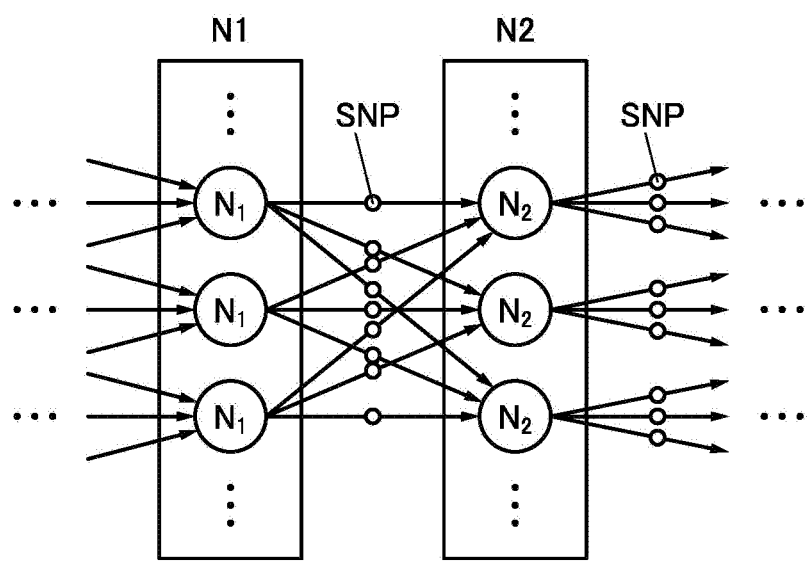
FIG. 11 is a configuration example of a neural network.

FIG. 11 illustrates a specific configuration example of the neural network NN. The outputs of a plurality of neurons N1 included in the neuron group N1 are input to a plurality of neuron N2 included in the neuron group N2 via the synapses SNP. In FIG. 11, open circles between neurons represent synapses SNP. The synapses SNP between the neuron group N1 and the neuron group N2 each have a function of multiplying an output of the neuron N1 by a weight coefficient and outputting the result to the neuron N2.

As illustrated in FIG. 10, a signal output from the neuron group N1 is multiplied by a weight coefficient by the synapse SNP. In other words, the synapse SNP has the function of performing multiplication (MUL). Note that weight coefficients are stored in the synapses SNP in advance. Then, the signal output from the synapses SNP is input to the neuron group N2.

The neurons included in the neuron group N2 each have a function of calculating the sum of signals input from the plurality of synapses SNP. In other words, the neuron has the function of doing addition (ADD). In this manner, a product-sum operation (MAD) is performed by the synapse and the neuron. Then, a signal obtained by the product-sum operation is converted based on the activation function, and is output to another neuron after that.

As described above, the synapse SNP has the function of an arithmetic circuit that performs multiplication of the output of a neuron and a weight coefficient, and a function of a memory that stores a weight coefficient. Thus, in the case where the neural network NN is formed by hardware, the synapse can be formed with the use of an arithmetic circuit and a memory. However, when an arithmetic circuit and a memory are separately formed, the circuit size increases. In addition, access to a memory is required every time multiplication is performed, which increases power consumption.

Here, in one embodiment of the present invention, the synapse is formed of a circuit in which a transistor using silicon (e.g., single crystal silicon) in the channel formation region (hereinafter such a transistor is referred to as a Si transistor) and an OS transistor are combined. Specifically, as illustrated in FIG. 10, a layer including an OS transistor (denoted by "OS" in the drawing) is provided over a layer including a Si transistor (denoted by "Si" in the drawing). Then, a circuit in which a function of performing multiplication and a function of storing a weight coefficient are united can be formed with the use of the Si transistor and the OS transistor. This can reduce the circuit size or the power consumption.

Hereinafter, a specific example of an analog product-sum operation circuit (OS-APS) that has the function of an arithmetic circuit and a function of a memory will be described.

Figure 12:
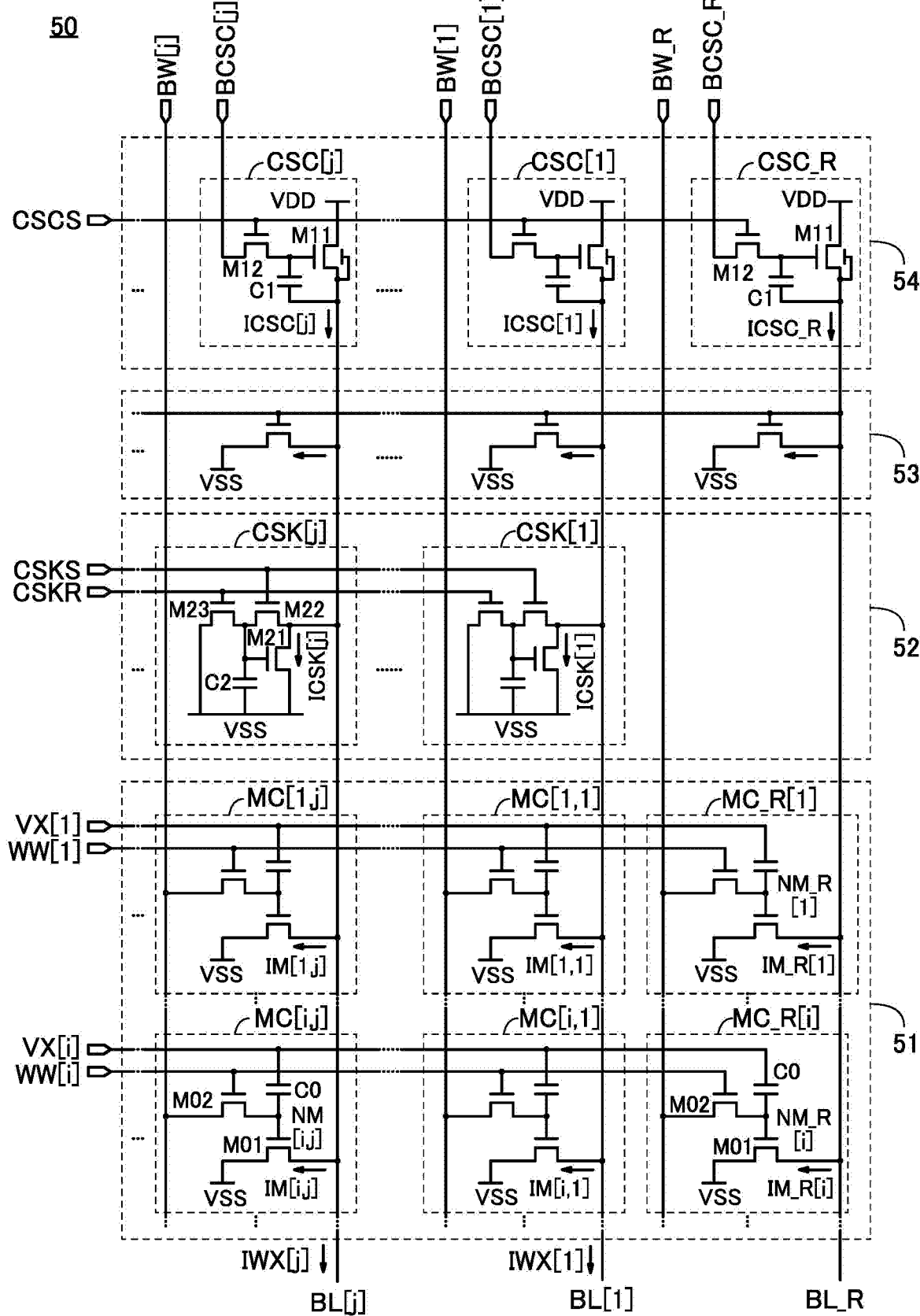
FIG. 12 is a circuit diagram illustrating an example of a product-sum operation circuit.

An APS (analog product-sum operation circuit) 50 illustrated in FIG. 12 includes a memory cell array 51, a circuit 52, a circuit 53, and a circuit 54. Note that in FIG. 12, VDD represents a high power supply potential and VSS represents a low power supply potential.

The memory cell array 51 includes memory cells MC[1, 1] to MC[i,j], which are arranged in a matrix with i rows and j columns (i and j are each an integer greater than or equal to 1), and memory cells MC_R[1] to MC_R[i], which are arranged in one column. The memory cells MC and the memory cells MC_R each have a function of retaining analog data. In addition, the memory cells MC_R[1] to MC_R[i] each have a function of a reference memory cell.

Note that in this specification, in the case where the bracketed numeral or alphabet that indicates the array is omitted, the symbol represents unspecified one of the arrayed elements. For example, the memory cell MC refers to unspecified one of the memory cells MC[1,1] to MC[i,j].

Note that as described later, the memory cell MC has the function of performing multiplication and a function of storing a weight coefficient. In other words, the memory cell MC has the function of a synapse.

The memory cell MC and the memory cell MC_R each include a transistor M01, a transistor M02, and a capacitor C0. Furthermore, in the memory cell MC, a gate of the transistor M01 is referred to as a node NM. Furthermore, in the memory cell MC_R, a gate of the transistor M01 is referred to as a node NM_R.

In the memory cell MC[i,j], the on/off of the transistor M02 is controlled by a signal WW[i]. A signal BW[j] is written to a node NM[i,j] through the transistor M02, and a signal VX[i] is written to the node NM[i,j] through the capacitor C0. The transistor M01 makes a current IM[i,j] flow in accordance with the potential of the node NM[i,j].

In the memory cell MC_R[i], the on/off of the transistor M02 is controlled by the signal WW[i]. A signal BW_R is written to a node NM_R[i] through the transistor M02, and the signal VX[i] is written to the node NM_R[i] through the capacitor C0. The transistor M01 makes a current IM_R[i] flow in accordance with the potential of the node NM_R[i].

In the memory cell MC, an OS transistor is preferably used as the transistor M02. Since the off-state current of an OS transistor is extremely low, the memory cell MC can retain the potential of the node NM (analog data) when the transistor M02 is turned off.

Similarly, an OS transistor is preferably used as the transistor M02 in the memory cell MC_R. When the transistor M02 is turned off, the memory cell MC_R can retain the potential of the node NM_R (analog data).

Note that there is no particular limitation on a transistor that can be used as the transistor M01. A Si transistor can be used as the transistor M01, for example. In that case, the transistor M02 can be stacked over the transistor M01, whereby such a synapse as illustrated in FIG. 10 can be formed.

The circuit 54 includes circuits CSC[1] to CSC[j] and a circuit CSC_R. The circuits CSC and CSC_R each include a transistor M11, a transistor M12, and a capacitor C1.

In the circuit CSC, the on/off of the transistor M12 is controlled by a signal CSCS. A signal BCSC is written to the gate of the transistor M11 and one of the terminals of the capacitor C1 through the transistor M12. The circuit CSC[j]

functions as a current source for the memory cells MC[1, j] to MC[i,j], and makes a current ICSC[j] flow.

In the circuit CSC_R, the on/off of the transistor M12 is controlled by the signal CSCS. A signal BCSC_R is written to the gate of the transistor M11 and one of the terminals of the capacitor C1 through the transistor M12. The circuit CSC_R functions as a current source for the memory cells MC_R[1] to MC_R[i], and makes a current ICSC R flow.

In the circuit CSC, an OS transistor is preferably used as the transistor M12. Since the off-state current of an OS transistor is extremely low, the circuit CSC can retain the potential of the gate of the transistor M11 (analog data) when the transistor M12 is turned off.

Similarly, an OS transistor is preferably used as the transistor M12 in the circuit CSC_R. When the transistor M12 is turned off, the circuit CSC_R can retain the potential of the gate of the transistor M11 (analog data).

The circuit 52 includes circuits CSK[1] to CSK[j]. The circuit CSK has the function of a current sink circuit. The circuit CSK includes a transistor M21, a transistor M22, a transistor M23, and a capacitor C2. The on/off of the transistor M22 is controlled by a signal CSKS, and the on/off of the transistor M23 is controlled by a signal CSKR.

In the circuit CSK, OS transistors are preferably used as the transistor M22 and the transistor M23. Since the off-state current of an OS transistor is extremely low, the circuit CSK can retain the potential of the gate of the transistor M21 (analog data) when the transistor M22 and the transistor M23 are turned off.

A wiring BL_R is electrically connected to the memory cells MC_R[1] to MC_R[i] and the circuit CSC_R. A wiring BL[j] is electrically connected to the memory cells MC [1, j] to MC[i,j], the circuit CSC[j], and the circuit CSK[j].

The circuit 53 has the function of a current mirror circuit, and has the function of copying the current flowing through the wiring BL_R to wirings BL[1] to BL[j].

The memory cell MC has the function of retaining a potential corresponding to a weight coefficient (W). When a potential corresponding to a multiplicand (X) is applied to the signal line VX[i], the transistor M01 makes a current IM corresponding to the product of W and X flow. The APS 50 performs an analog product-sum operation by detecting the sum of the currents IM (a current IWX).

Note that the memory cell MC can be formed using a small number of elements as illustrated in FIG. 12. Thus, the multiplication circuit and the memory can have relatively simple structures, and the circuit size of the neural network NN can be reduced.

Figure 13:
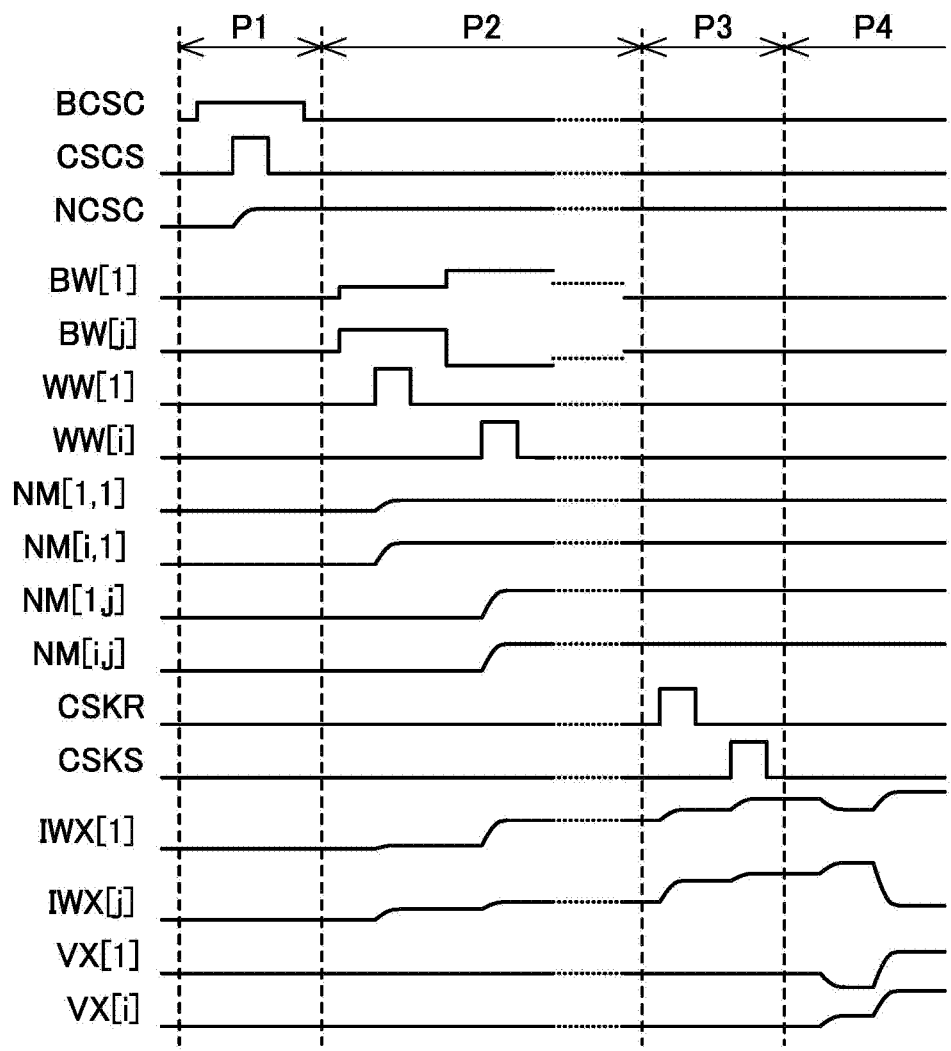
FIG. 13 is a timing chart showing an operation example of a product-sum operation circuit.

The timing chart in FIG. 13 shows an example of the operation of the APS 50. FIG. 13 is divided into Periods P1 to P4 in order to show the timing of the operation.

In Period P1, electric charge is written to the circuit CSC. In Period P2, data corresponding to a weight coefficient is written to the memory cell MC. In Period P3, electric charge that can make an offset current flow to the circuit CSK is written. In Period P4 and thereafter, the result of the analog product-sum operation is output as a current IWX[j], in accordance with the potential of the signal VX[i].

The transistors used in the APS 50 are all n-channel transistors. Thus, there is no need to separately form n-channel transistors and p-channel transistors in the APS 50, which can drastically reduce the manufacturing cost. Furthermore, the APS 50 can be formed using only OS transistors. In the case where the pixel portion 11 in FIG. 3 and FIG. 9 is formed using OS transistors, for example, the NN circuit 19 and the pixel portion 11 can be fabricated through the same manufacturing process. In other words, the pixel portion 11 and the NN circuit 19 can be fabricated over the same substrate at the same time. As a result, the manufacturing cost of the display panel can be drastically reduced. In addition, since OS transistors can be formed over a large-sized glass substrate, a large-scale product-sum operation circuit can be manufactured.

As described above, with the use of the analog product-sum operation circuit described in this embodiment, a semiconductor device capable of efficiently performing product-sum operations can be provided. Furthermore, a semiconductor device capable of efficiently forming a neural network can be provided.

Embodiment 4

In this embodiment, a specific example of the analog product-sum operation circuit (OS-APS) using the OS memory described in the above embodiment will be described with reference to FIG. 14 to FIG. 18. An example that is different from the analog product-sum operation circuit described in Embodiment 3 will be described in this embodiment. Note that in this embodiment, a gate refers to a front gate unless otherwise specified.

<Configuration of Product-Sum Operation Circuit>

Figure 14:
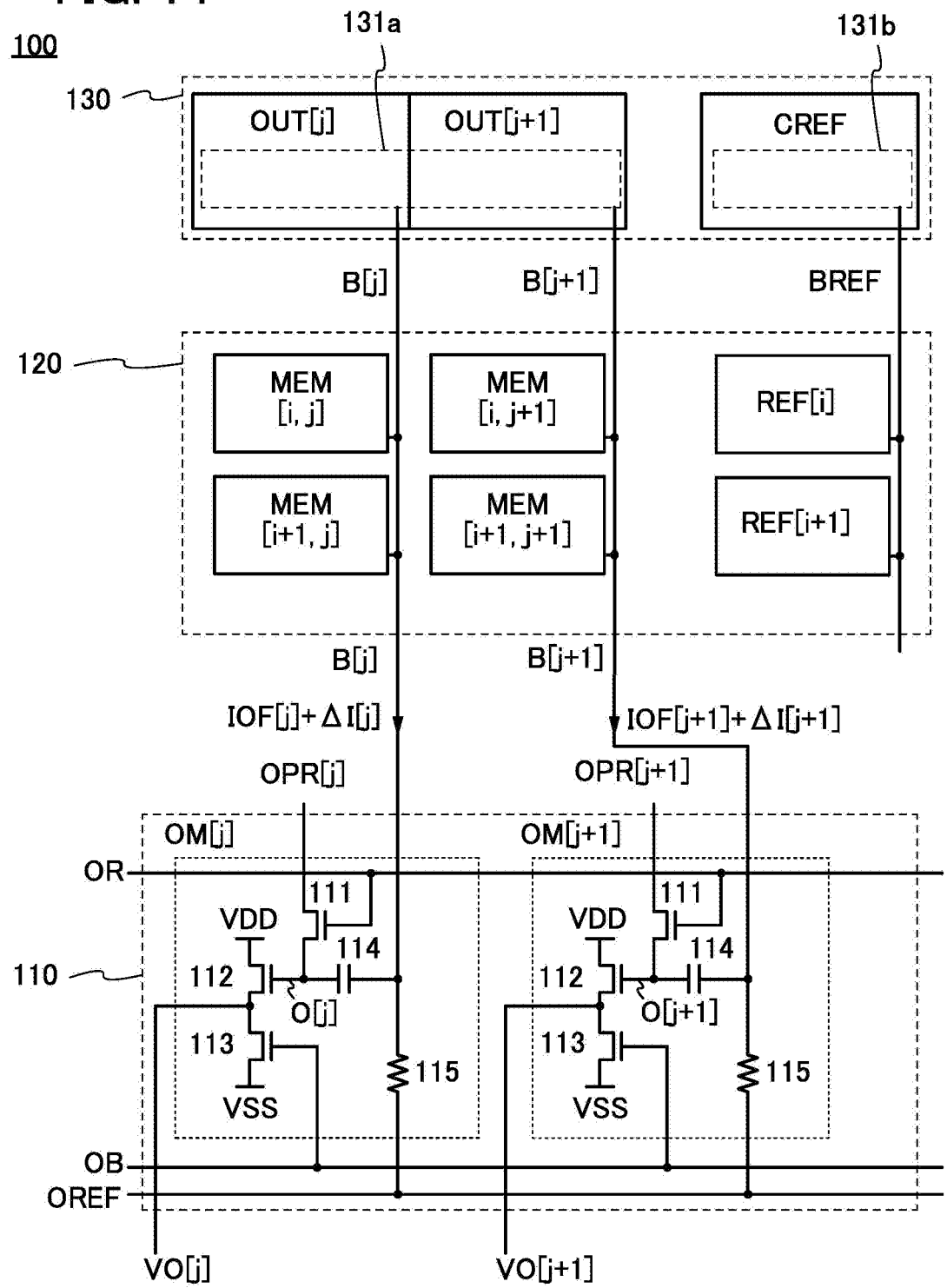
FIG. 14 is a diagram illustrating another configuration example of a product-sum operation circuit.

FIG. 14 illustrates an example of the configuration of an APS (analog product-sum operation circuit) 100. The APS 100 includes a current source circuit 130, a memory cell array 120, and an offset circuit 110.

The current source circuit 130 includes n column output circuits OUT in a row direction and a reference column output circuit CREF. The memory cell array 120 includes m×n (m in the column direction and n in the row direction) memory cells MEM arranged in a matrix, and m memory cells REF in the column direction. The offset circuit 110 includes n column input circuits OM in the row direction. Here, n is an integer greater than 1, and m is an integer greater than 1. In addition, i is an integer that is greater than or equal to 1 and less than or equal to m−1, and j is an integer that is greater than or equal to 1 and less than or equal to n−1. The memory cell that is placed in the i-th row and in the j-th column is denoted by MEM [i,j], for example.

Part of the column output circuit OUT can function as a constant current circuit 131a, and part of the reference column output circuit can function as a constant current circuit 131b. Furthermore, another part of the column output circuit OUT and another part of the reference column output circuit CREF can function as a current mirror.

A signal line B[j] and a signal line B[j+1] which are electrically connected to the constant current circuit 131a of the column output circuits OUT are electrically connected to a memory cell MEM in [j] column and a memory cell MEM in [j+1] column, respectively. Furthermore, a signal line BREF which is electrically connected to the constant current circuit 131b of the reference column output circuit CREF is electrically connected to a reference memory cell REF.

A column input circuit OM[j] and a column input circuit OM[j+1] included in the offset circuit 110 each include a transistor 111, a transistor 112, a transistor 113, a capacitor 114, a resistor 115, and a retention node O[j] or a retention node O[j+1].

In addition, the offset circuit 110 includes a signal line ORP, a signal line OR, a signal line OB, a signal line OREF, and a signal line VO serving as an output terminal. The column input circuit OM[j] and the column input circuit OM[j+1] are electrically connected to the memory cell MEM in column [j] and the memory cell MEM in column [j+1] via the signal line B[j] and the signal line B[j+1], respectively.

In the column input circuit OM[j], the first terminal of the transistor 111 is electrically connected to OPR[j], the gate of the transistor 111 is electrically connected to the signal line OR, and the second terminal of the transistor 111 is electrically connected to the gate of the transistor 112 and the first terminal of the capacitor 114. Furthermore, VDD (may be also referred to as a high power supply potential, a first potential of power supply, or the like) is supplied to the first terminal of the transistor 112, and the second terminal of the transistor 112 is electrically connected to the first terminal of the transistor 113 and the signal line VO[j] serving as an output terminal. The gate of the transistor 113 is electrically connected to the signal line OB, and VSS (may be also referred to as a low power supply potential, a second potential of power supply, or the like) is supplied to the second terminal of the transistor 113. The second terminal of the capacitor 114 is electrically connected to the signal line B[j] and the first terminal of the resistor 115. The second terminal of the resistor 115 is electrically connected to the signal line OREF.

As illustrated in FIG. 14, the node electrically connected to the second terminal of the transistor 111, the gate of the transistor 112, and the first terminal of the capacitor 114 may be referred to as a retention node O[j].

Similarly, in the column input circuit OM[j+1], the first terminal of the transistor 111 is electrically connected to OPR[j+1], the gate of the transistor 111 is electrically connected to the signal line OR, and the second terminal of the transistor 111 is electrically connected to the gate of the transistor 112 and the first terminal of the capacitor 114. Furthermore, VDD (may be also referred to as a high power supply potential, a first potential of power supply, or the like) is supplied to the first terminal of the transistor 112, and the second terminal of the transistor 112 is electrically connected to the first terminal of the transistor 113 and the signal line VO[j+1] serving as an output terminal. The gate of the transistor 113 is electrically connected to the signal line OB, and VSS (may be also referred to as a low power supply potential, a second potential of power supply, or the like) is supplied to the second terminal of the transistor 113. The second terminal of the capacitor 114 is electrically connected to the signal line B[j+1] and the first terminal of the resistor 115. The second terminal of the resistor 115 is electrically connected to the signal line OREF.

The node electrically connected to the second terminal of the transistor 111, the gate of the transistor 112, and the first terminal of the capacitor 114 may be referred to as a retention node O[j+1].

A control signal can be supplied through the signal line OR. Preset potentials of the retention node O[j] and the retention node O[j+1] can be supplied through the signal line OPR[j] and the signal line OPR[j+1], respectively. A bias potential for driving the transistor 113 as a constant current source can be supplied through the signal line OB. A reference potential for performing current-voltage conversion in the resistor 115 can be supplied through the signal line OREF. Potentials conveying the results of the product-sum operations of the column [j] and the column [j+1] can be output through the signal line VO[j] and the signal line VO[j+1], respectively.

Example of Memory Cell Array

Next, an example of the configuration of the memory cell array 120 included in the APS 100 will be described with reference to FIG. 15. The memory cell array 120 can function as an analog memory. However, the configuration of the memory cell array 120 is not limited to that in FIG. 15. The other configuration may be used as long as the circuit configuration can function as an analog memory.

Figure 15:
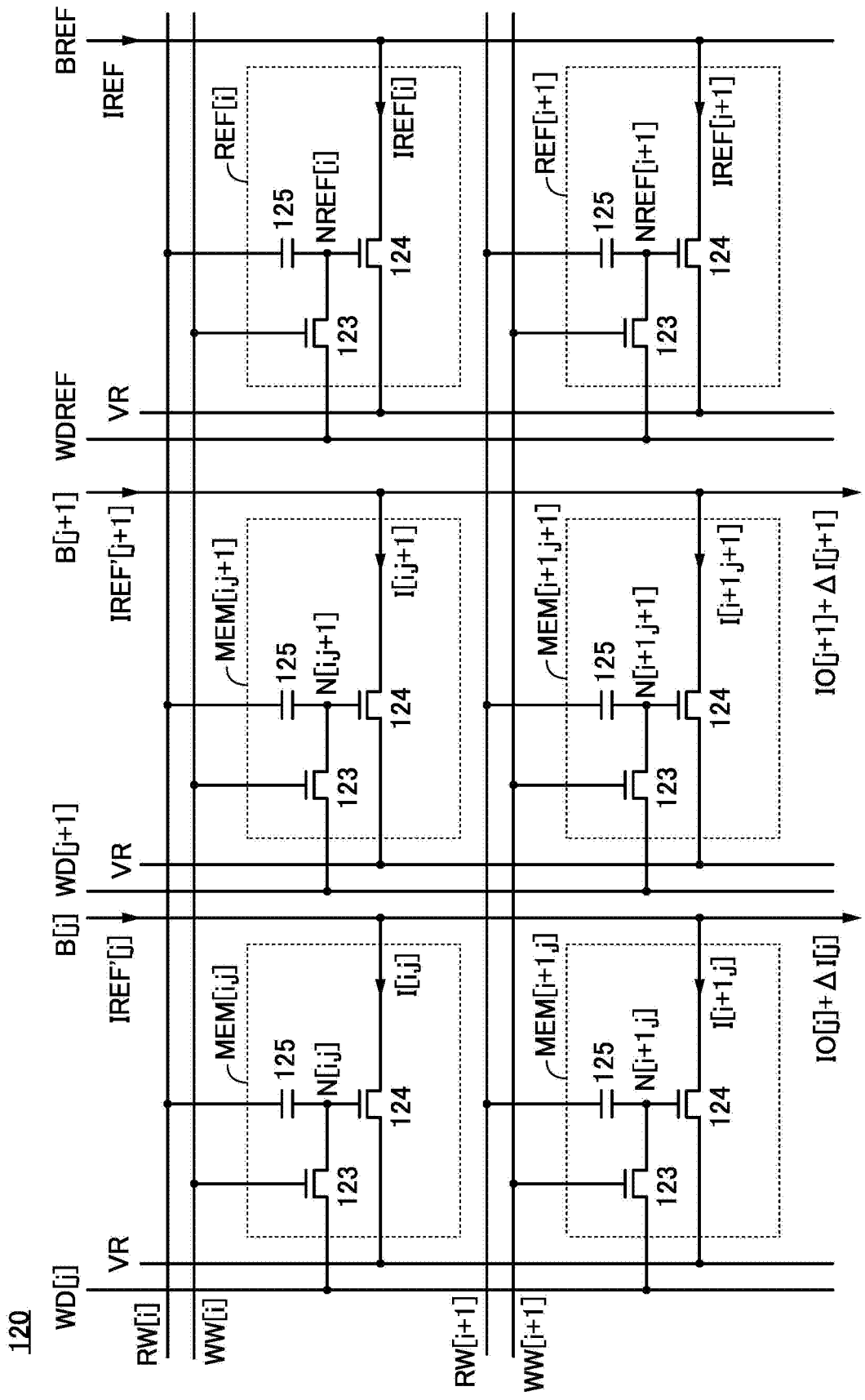
FIG. 15 is a circuit diagram illustrating an example of a memory cell array in a product-sum operation circuit.

As described above, the memory cell array 120 illustrated in FIG. 15 includes a memory cell MEM[i,j], a memory cell MEM[i,j+1], a memory cell MEM[i+1,j], and a memory cell MEM[i+1, j+1]. In addition, the memory cell array 120 includes a reference memory cell REF[i] and a reference memory cell REF[i+1].

Furthermore, the memory cells MEM[i,j] to MEM[i+1, j+1] each include a power supply line VR, a signal line WD[j] or a signal line WD[j+1], a signal line RW[i] or a signal line RW[i+1], and a signal line WW[i] or a signal line WW[i+1]. In addition, the memory cells MEM[i,j] to MEM[i+1, j+1] are electrically connected to the signal line B[j] and the signal line B[j+1]. The reference memory cells REF[i] and REF[i+1] each include the power supply line VR, a reference signal line WDREF, the signal line RW[i] or the signal line RW[i+1], and the signal line WW[i] or the signal line WW[i+1]. In addition, the reference memory cells REF[i] and REF[i+1] are electrically connected to the signal line BREF.

The memory cells MEM[i,j] to MEM[i+1, j+1] and the reference memory cells REF[i] and REF[i+1] each include a transistor 123, a transistor 124, and a capacitor 125.

In the memory cell MEM[i,j], the first terminal of the transistor 123 is electrically connected to the signal line WD[j], the gate of the transistor 123 is electrically connected to the signal line WW[j], the second terminal of the transistor 123 is electrically connected to the first terminal of the capacitor 125 and the gate of the transistor 124. The first terminal of the transistor 124 is electrically connected to the power supply line VR, and the second terminal of the transistor 124 is electrically connected to the signal line B[j]. The second terminal of the capacitor 125 is electrically connected to the signal line RW[i].

As illustrated in FIG. 15, the node electrically connected to the second terminal of the transistor 123, the first terminal of the capacitor 125, and the gate of the transistor 124 may be referred to as a charge retention node N[i,j].

A potential (here, a low potential) can be supplied through the power supply line VR. A control signal can be supplied through each of the signal line WW[i], the signal line WW[i+1], the signal line RW[i], and the signal line RW[j+1]. A data signal can be supplied through each of the signal line WD[j] and the signal line WD[j+1]. Current corresponding to the data of the memory cell in each column can be output to the signal line B[j] and the signal line B[j+1]. Current corresponding to the data of the reference memory cell can be output to the signal line BREF.

In the charge retention node N[i,j], a charge retention node N[i,j+1], a charge retention node N[i+1,j], a charge retention node N[i+1, j+1], a charge retention node NREF[i], and a charge retention node NREF[i+1], a charge corresponding to data can be accumulated.

Note that current (sink current) flowing to the transistor 124 included in the memory cell MEM[i,j] is denoted by I[i,j]. Similarly, current flowing to the transistor 124 included in the memory cell MEM[i,j+1] is denoted by I[i,j+1], current flowing to the transistor 124 included in the memory cell MEM[i+1,j] is denoted by I[i+1,j], and current flowing to the transistor 124 included in the memory cell MEM[i+1, j+1] is denoted by I[i+1, j+1]. In addition, current flowing to the transistor 124 included in the reference memory cell REF[i] is denoted by IREF[i], and current flowing to the transistor 124 included in the reference memory cell REF[i+1] is denoted by IREF[i+1].

For electrical connection, functions, and the like in the other memory cells, FIG. 15 and the description of the memory cell MEM [i,j] can be referred to.

Example 1 of Current Source Circuit

Next, an example of the configuration of the current source circuit 130 included in the APS 100 will be described with reference to FIG. 16.

The current source circuit 130 includes a column output circuit OUT[j], a column output circuit OUT[j+1], and the reference column output circuit CREF, as described above. Furthermore, the current source circuit 130 includes the constant current circuit 131a, the constant current circuit 131b, and a current mirror.

The column output circuit OUT[j] and the column output circuit OUT[j+1] each include a transistor 132, a transistor 133, a transistor 134, a capacitor 135, and a node NG[j] or a node NG[j+1]. Note that the transistor 132 is a dual-gate transistor. In the case where the transistor has a dual-gate structure, one gate may be referred to as a first gate, a front gate, or simply a gate, and the other gate may be referred to as a second gate or a back gate.

The reference column output circuit CREF includes a transistor 136, a transistor 137, a transistor 138, and a capacitor 139. The transistor 136 is a dual-gate transistor.

The column output circuit OUT[j] and the column output circuit OUT[j+1] include a signal line GW, a signal line FG[j], a signal line FG[j+1], a signal line B[j], and a signal line B[j+1].

The reference column output circuit CREF includes the signal line GW, a signal line FGREF, and a signal line BREF.

In the column output circuit OUT[j], the front gate of the transistor 132 is electrically connected to the first terminal of the transistor 133 and the first terminal of the capacitor 135. The back gate of the transistor 132 is electrically connected to the first terminal of the transistor 132, the second terminal of the capacitor 135, the first terminal of the transistor 134, and the signal line B[j]. VDD is supplied to the second terminal of the transistor 132. The gate of the transistor 133 is electrically connected to the signal line GW, and the second terminal of the transistor 133 is electrically connected to the signal line FG[j]. The gate of the transistor 134 is electrically connected to the gate of the transistor 134 of the column output circuit OUT[j+1], the gate of the transistor 138 of the reference column output circuit CREF, the signal line BREF, the first terminal of the transistor 138, the back gate of the transistor 136, the second terminal of the transistor 136, and the second terminal of the capacitor 139. VSS is supplied to the second terminal of the transistor 134.

Figure 16:
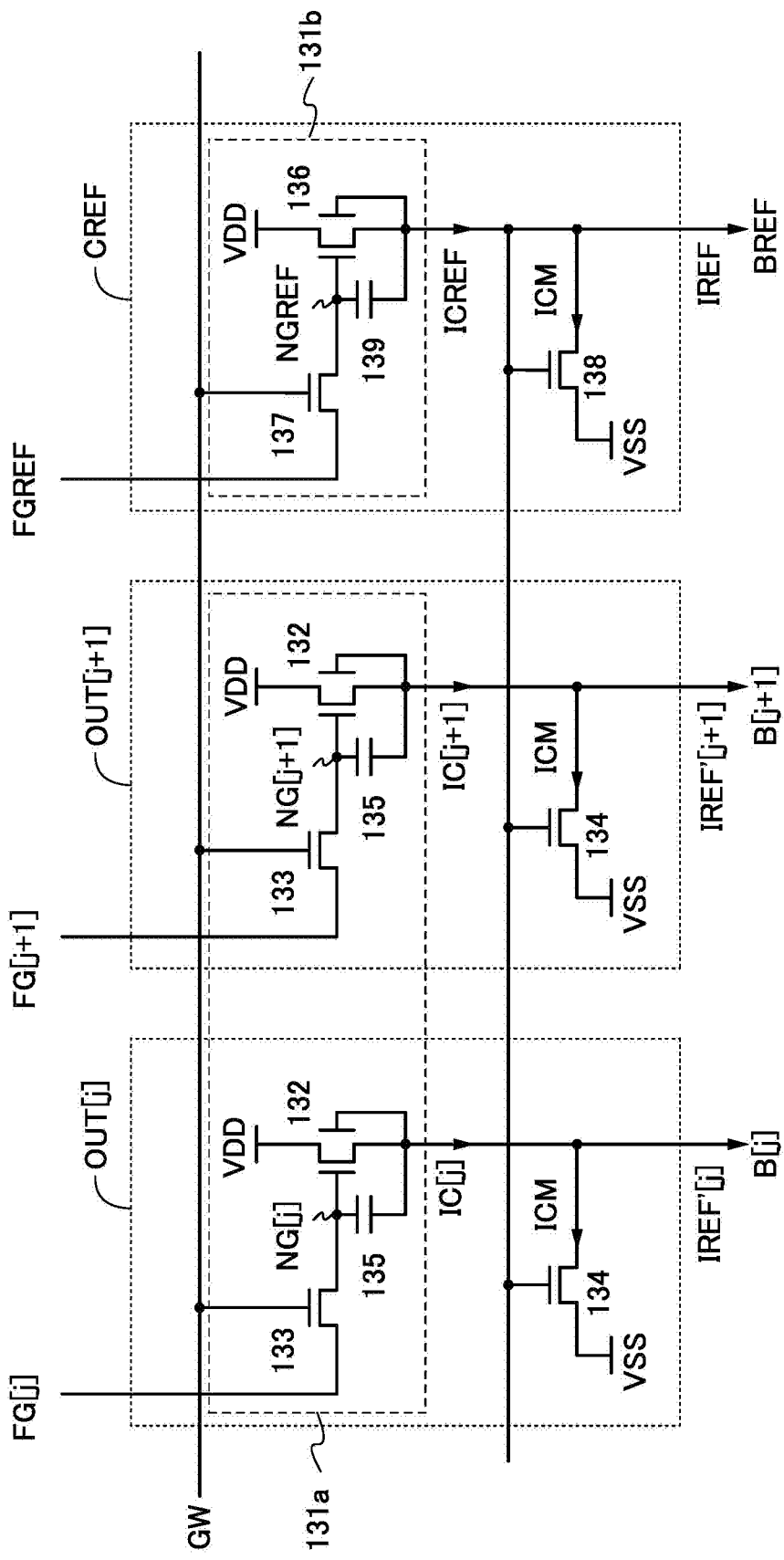
FIG. 16 is a circuit diagram illustrating an example of a current source circuit for a product-sum operation circuit.

As illustrated in FIG. 16, the node electrically connected to the front gate of the transistor 132, the first terminal of the transistor 133, and the first terminal of the capacitor 135 may be referred to as a node NG[j].

Similarly, in the column output circuit OUT[j+1], the front gate of the transistor 132 is electrically connected to the first terminal of the transistor 133 and the first terminal of the capacitor 135. The back gate of the transistor 132 is electrically connected to the first terminal of the transistor 132, the second terminal of the capacitor 135, the first terminal of the transistor 134, and the signal line B[j+1]. VDD is supplied to the second terminal of the transistor 132. The gate of the transistor 133 is electrically connected to the signal line GW, and the second terminal of the transistor 133 is electrically connected to the signal line FG[j+1]. VSS is supplied to the second terminal of the transistor 134.

The node electrically connected to the front gate of the transistor 132, the first terminal of the transistor 133, and the first terminal of the capacitor 135 may be referred to as a node NG[j+1]

In the reference column output circuit CREF, the front gate of the transistor 136 is electrically connected to the first terminal of the transistor 137 and the first terminal of the capacitor 139. The back gate of the transistor 136 is electrically connected to the first terminal of the transistor 136, the second terminal of the capacitor 139, the gate of the transistor 138, the first terminal of the transistor 138, the gates of the transistors 134 of the column output circuit OUT[j] and the column output circuit OUT[j+1], and the signal line BREF, as described above. VDD is supplied to the second terminal of the transistor 136. The gate of the transistor 137 is electrically connected to the signal line GW, and the second terminal of the transistor 137 is electrically connected to the signal line FGREF. VSS is supplied to the second terminal of the transistor 138.

As illustrated in FIG. 16, the node electrically connected to the front gate of the transistor 136, the first terminal of the transistor 137, and the first terminal of the capacitor 139 may be referred to as NGREF.

A control signal can be supplied through the signal line GW. When the signal line of the signal line GW is "H", the transistor 133 of the column output circuit OUT[j], the transistor 133 of the column output circuit OUT[j+1], and the transistor 137 of the reference column output circuit CREF are turned on. At this time, given voltage can be written to the front gate of the transistor 132 of the column output circuit OUT[j] (i.e., the node NG[j]), the front gate of the transistor 132 of the column output circuit OUT[j+1] (i.e., the node NG[j+1]), and the front gate of the transistor 136 of the reference column output circuit CREF (i.e., the node NGREF) through the signal line FG[j], the signal line FG[j+1], and the signal line FGREF, respectively. Thus, the transistor 132 and the transistor 136 can be normally on.

Note that currents IREF'[j] and IREF[j+1] can flow through the signal line B[j] and the signal line B[j+1], respectively. The currents correspond to the sum of current (sink current) ICM flowing to the transistors 134 of the column output circuit OUT[j] and the column output circuit OUT[j+1], and currents (discharge currents) IC[j] and IC[j+1] flowing through the transistors 132, respectively.

Similarly, current IREF which corresponds to the sum of current (sink current) ICM flowing to the transistor 138 and current (discharge current) ICREF flowing through the transistor 136 can flow through the signal line BREF.

Here, the source potential of the transistor 136 is determined such that the current IREF becomes equal to the sum of the currents (sink currents) IREF[i] and IREF[i+1] flowing to the transistors 124 included in the reference memory cells REF. In addition, when the transistor size (the channel length and the channel width) of the transistor 134 is made equal to the transistor size of the transistor 138, the current (sink current) flowing to the transistor 134 can be ICM.

In other words, since the transistors 134 of the column output circuit OUT[j] and the column output circuit OUT [j+1] and the transistor 138 of the reference column output circuit CREF constitute the current mirror, current with the same value can flow to the signal line B[j], the signal line B[j+1], and the signal line FGREF.

The above-mentioned transistors used in the APS 100 are all n-channel transistors. Thus, there is no need to separately form n-channel transistors and p-channel transistors in the APS 100, which can drastically reduce the manufacturing cost. Furthermore, the APS 100 can be formed using only OS transistors. In the case where the pixel portion 11 in FIG. 3 and FIG. 9 is formed using OS transistors, the NN circuit 19 and the pixel portion 11 can be fabricated through the same manufacturing process. In other words, the pixel portion 11 and the NN circuit 19 can be fabricated over the same substrate at the same time. As a result, the manufacturing cost of the display panel can be drastically reduced. In addition, since OS transistors can be formed over a large-sized glass substrate, a large-scale product-sum operation circuit can be manufactured.

Example 2 of Current Source Circuit

Figure 17:
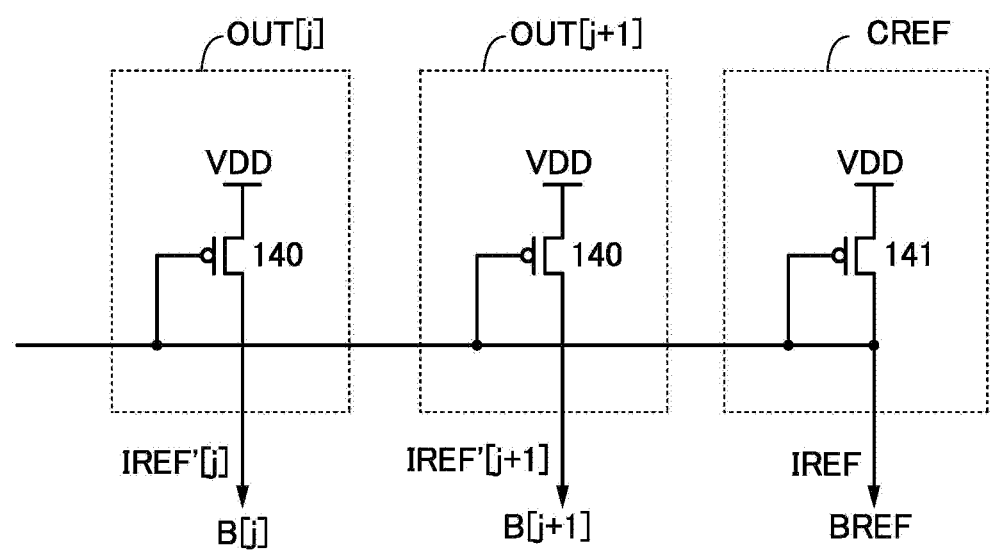
FIG. 17 is a circuit diagram illustrating another example of a current source circuit for a product-sum operation circuit.

The current source circuit 130 included in the APS 100 is not limited to the configuration in FIG. 16. For example, p-channel transistors may be used to constitute the current source circuit 130. FIG. 17 illustrates a configuration example of the current source circuit 130 including p-channel transistors.

A column output circuit OUT[j] and a column output circuit OUT[j+1] each include a p-channel transistor 140. A reference column output circuit CREF includes a p-channel transistor 141.

The column output circuit OUT[j] and the column output circuit OUT[j+1] include the signal line B[j] and a signal line B[j+1]. The reference column output circuit CREF includes the signal line BREF.

In the column output circuit OUT[j], the gate of the transistor 140 is electrically connected to the gate of the transistor 140 of the column output circuit OUT[j+1], the gate of the transistor 141 of the reference column output circuit CREF, the first terminal of the transistor 141, and the signal line BREF. The first terminal of the transistor 140 is electrically connected to the signal line B[j]. VDD is supplied to the second terminal of the transistor 140. The transistor 140 can function as a constant current circuit.

Similarly, in the column output circuit OUT[j+1], the first terminal of the transistor 140 is electrically connected to the signal line B[j+1]. VDD is supplied to the second terminal of the transistor 140.

In the reference column output circuit CREF, the gate of the transistor 141 is electrically connected to the first terminal of the transistor 141, the signal line BREF, and the gates of the transistors 140 of the column output circuit OUT[j] and the column output circuit OUT[j+1], as described above. VDD is supplied to the second terminal of the transistor 141. The transistor 141 can function as a constant current circuit.

The transistors 140 of the column output circuit OUT[j] and the column output circuit OUT[j+1] and the transistor 141 of the reference column output circuit CREF constitute the current mirror, and each function as a constant current circuit; thus, current having the same value can flow to the signal line B[j], the signal line B[j+1], and the signal line BREF.

Note that the configuration of the current source circuit 130 is not limited to those in FIG. 16 and FIG. 17, and may be another configuration as long as it can function as a constant current circuit.

<Timing Chart>

Next, an example of the operation of the APS 100 illustrated in FIG. 14 in the case where the memory cell array 120 has the configuration illustrated in FIG. 15 and the current source circuit 130 has the configuration illustrated in FIG. 16 will be described, with reference to the timing chart of FIG. 18.

Figure 18:
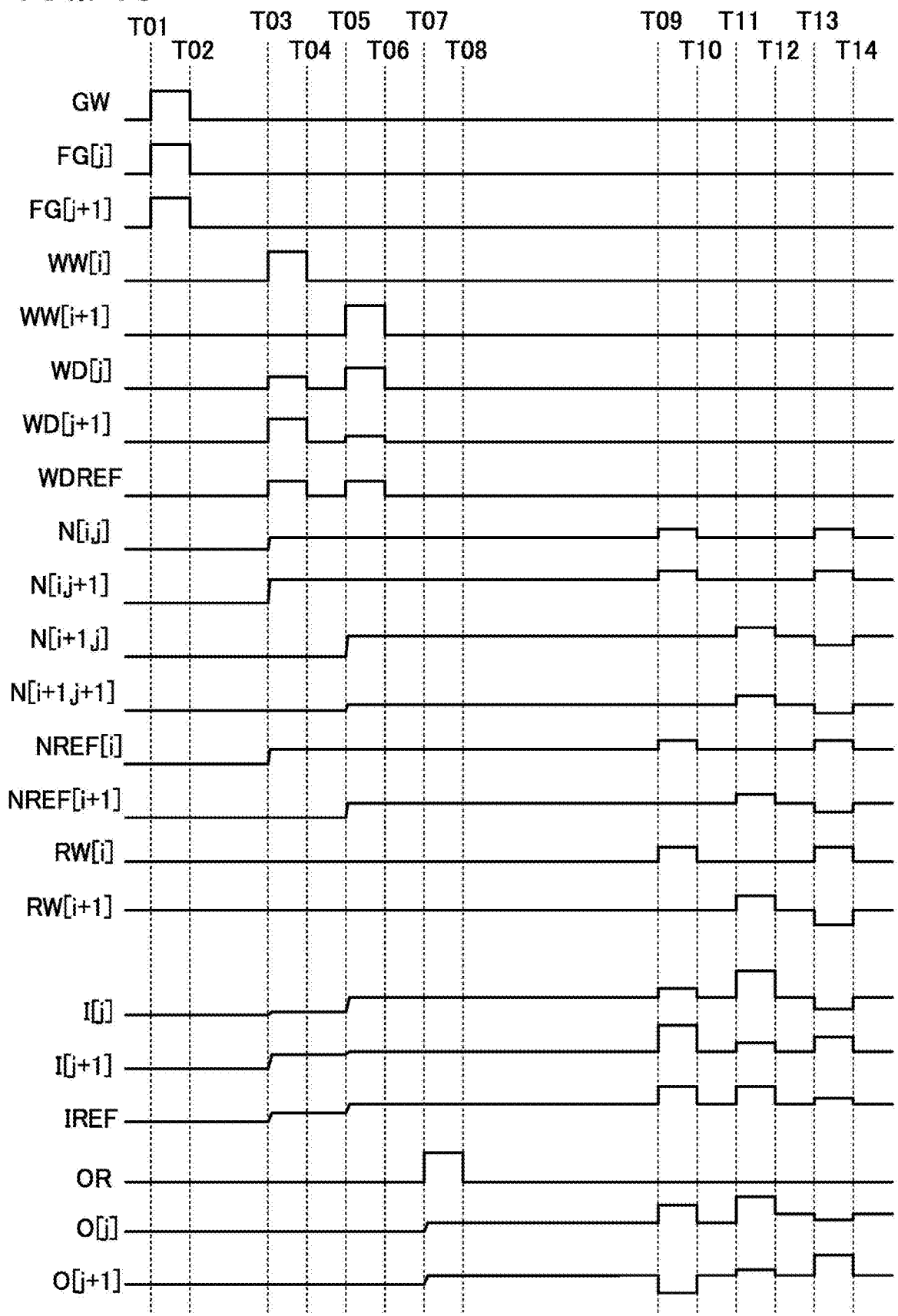
FIG. 18 is a timing chart showing an operation example of a product-sum operation circuit.

The period from Time T01 to time T02 in FIG. 18 corresponds to an operation of applying voltage to the nodes NG[j], NG[j+1], and NGREF electrically connected to the gates of the transistors 132 and the transistor 136 in order to make the transistors 132 and the transistor 136 operate as current sources.

The period from Time T03 to Time T06 corresponds to an operation of storing first analog data in each memory cell.

The period from Time T07 to Time T08 corresponds to an operation of setting a preset potential to the column input circuit of the offset circuit.

The period from Time T09 to Time T14 corresponds to an operation of obtaining output data corresponding to the product of first analog data and second analog data, the first analog data being stored in the memory cell in each row and the second analog data corresponding to the selection signal supplied to the memory cell in each row.

Here, the power supply line VR is set at a low potential, the power supply line VDD is at a high potential, and the power supply line VSS is set at a low potential. In addition, the transistor 112, the transistor 113, the transistor 124, the transistor 132, the transistor 134, the transistor 136, and the transistor 138 each operate in the saturated region unless otherwise specified. In other words, the gate voltage, source voltage, and drain voltage of the transistors are appropriately biased to such voltage that allows the transistors operate in the saturation region. Note that even when the operation of the transistors is deviated from operation in an ideal saturation region, the gate voltage, source voltage, and drain voltage of the transistors are regarded as being appropriately biased as long as the accuracy of output data is obtained within a desired range.

Note that OS transistors are preferably used as the other transistors, i.e., the transistor 111, the transistor 123, the transistor 133, and the transistor 137. Since off-state current of OS transistors is extremely low, the use of OS transistors enable these transistors to function as ideal switches. Thus, potentials stored in the capacitor 114, the capacitor 125, the capacitor 135, and the capacitor 139 can be retained for a long time.

Note that current I, current IREF, and current ICM in the period from time T03 to T08 are denoted by current I0, current IREF0, and current ICM0, respectively. In addition, the current flowing through the signal line B in the period from Time T03 to T08 is denoted by current IOF.

First, in the period from Time T01 to Time T02, when the potential of the signal line GW is set at "H", the potential of the signal line FG[j] is set at VG[i], the potential of the signal line FG[i+1] is set at VG[i+1], and the potential of the signal line FGREF is set at VGREF, potentials of the nodes NG[i], NG[i+1], and NGREF become VG[i], VG[i+1], and VGREF, respectively. Here, VG[j], VG[j+1], and VGREF are potentials for driving the transistor 132 and the transistor 136 on normally-on basis.

In the period from Time T03 to Time T04, the signal line WW[i] is set at "H", the signal line WW[i+1] is set at "L", the potential of the signal line WD[i] is set at VPR−VX[i,j], the potential of the signal line WD[i+1] is set at VPR−VX[i,j+1], the potential of the signal line WDREF is set at VPR, the potential of the signal line RW[i] is set at a reference potential, and the potential of the signal line RW[i+1] is set at a reference potential. At this time, the potential of the charge retention node N[i,j] is set at VPR−VX[i,j], the potential of the charge retention node N[i,j+1] is set at VPR−VX[i,j+1], and the potential of the charge retention node NREF[i] is set at VPR. Here, VX[i,j] and VX[i,j+1] are each a potential corresponding to any of multiple pieces of first analog data.

In the period from Time T05 to Time T06, the signal line WW[i] is set at "L", the signal line WW[i+1] is set at "H", the potential of the signal line WD[j] is set at VPR−VX[i+1, j], the potential of the signal line WD[j+1] is set at VPR−VX[i+1, j+1], the potential of the signal line WDREF is set at VPR, the potential of the signal line RW[i] is set at a reference potential, and the potential of the signal line RW[i+1] is set at a reference potential. At this time, the potential of the charge retention node N[i+1,j] is set at VPR−VX[i+1,j], the potential of the charge retention node N[i+1, j+1] is set at VPR−VX[i+1, j+1], and the potential of the charge retention node NREF[i+1] is set at VPR. Here, VX[i+1,j] and VX[i+1, j+1] are each a potential corresponding to any of multiple pieces of first analog data.

Here, current (sink current) I0[i,j] flowing to the transistor 124 in the memory cell MEM[i,j] is expressed by the following:

$$I0[i, j] = k(VPR - VX[i, j] - Vth)^2. \qquad \text{Formula (1)}$$

Current (sink current) IREF0[i] flowing to the transistor 124 in the reference memory cell REF[i] is expressed by the following:

$$IREF0[i] = k(VPR - Vth)^2. \qquad \text{Formula (2)}$$

Here, k is a coefficient and Vth is the threshold voltage of the transistor 124.

In the reference column output circuit CREF, the sum of current (sink current) IREF0[i] flowing to the transistor 124 included in the reference memory cell REF[i], i.e., ΣIREF0[i]=IREF0, flows through the signal line BREF. The gate potential of the transistor 138 is set such that IREF0 becomes equal to ICREF−ICM0; in other words, such that the following equation is satisfied:

$$ICREF - ICM0 = \sum IREF0[i]. \qquad \text{Formula (3)}$$

Here, the transistor 134 and the transistor 138 constitute the current mirror and thus the current ICM0 also flows to the transistor 134.

In the period from Time T07 to Time T08, when the signal line OR is set at "H", the signal line OPR[j] is set at VOPR[j], the signal line OPR[j+1] is set at VOPR[j+1], and the signal line OREF is set at VREF, potentials of the retention node O[j] and the retention node O[j+1] in the column input circuit OM[j] and the column input circuit OM[j+1] become VOPR[j] and VOPR[j+1], respectively. Although VOPR[j] and VOPR[j+1] may be different values in different columns or the same value, they are preferably values with which the transistors 112 are turned on and that do not exceed VDD. The transistor 113 operates as a constant current source when an appropriate bias potential is supplied to its gate through the signal line OB, and the transistor 112 operates as a source follower; thus, output voltage VOPR[j]−Vtho and output voltage VOPR[j+1]−Vtho are output through the signal line VON and the signal line VO[j+1], respectively. Note that Vtho is the threshold voltage of the transistor 112. Accordingly, the initial value of the output voltage can be constant regardless of the value of the initial value IOF[j] of the output current.

The current IC[j] flows through the transistor 132 (discharge), the current ICM0 flows to the transistor 134 (sink), the current I0[i,j] flows to the transistor 124 included in the memory cell MEM[i,j] (sink), and the current I0[i+1,j] flows to the transistor 124 included in the memory cell MEM[i+1,j]; thus, when the potential of the signal line RW[i] is a reference potential and the potential of the signal line RW[i+1] is a reference potential, the following equation is satisfied:

$$IC[j] - ICM0 - \sum I0[i, j] = IOF[j]. \qquad \text{Formula (4)}$$

Before moving on to the description of operation after Time T09, the case where the potential of the signal line RW[i] is set at a potential higher than a reference potential by VW[i] (hereinafter, expressed as "the potential of the signal line RW[i] is set at VW[i]") will be considered. Here, VW[i] is a potential corresponding to the second analog data. Note that the potential of the signal line RW[i] is superimposed on the gate potential of the transistor 124 through the capacitor 125; thus, the potential change of the signal line RW[i] does not directly correspond to the increase in the gate potential of the transistor 124. More specifically, a potential change, which is obtained by multiplying a capacitive coupling coefficient that can be calculated from the capacitance of the capacitor 125, the gate capacitance of the transistor 124, and parasitic capacitance by the potential change of the signal line RW[i], corresponds to the increase in the gate potential of the transistor 124. Here, in order to simplify the description, a potential obtained by multiplication of the capacitive coupling capacitive coefficient is VW[i]; however, a potential actually supplied to the signal line RW[i] may be converted as appropriate using the capacitive coupling capacitive coefficient.

At this time, the current (sink current) I[i,j] flowing to the transistor 124 in the memory cell MEM[i,j] is expressed as follows:

$$I[i, j] = k(VPR - VX[i, j] + VW[i] - Vth)^2. \qquad \text{Formula (5)}$$

In addition, the current (sink current) IREF[i] flowing to the transistor 124 in the reference memory cell REF[i] is expressed as follows:

$$IREF[i] = k(VPR + VW[i] - Vth)^2. \qquad \text{Formula (6)}$$

In the reference column output circuit CREF, the sum of current (sink current) IREF[i] flowing to the transistor 124 included in the reference memory cell REF[i], i.e., ΣIREF[i]=IREF, flows through the signal line BREF. The gate potential of the transistor 138 is set such that IREF becomes equal to ICREF−ICM; in other words, such that the following equation is satisfied:

$$ICREF - ICM = \sum IREF[i]. \qquad \text{Formula (7)}$$

Here, the transistor 134 and the transistor 138 constitute the current mirror and thus the current ICM also flows to the transistor 134.

Here, the current IC[j] flows through the transistor 132 (discharge), the current ICM flows to the transistor 134 (sink), the current I[i,j] flows to the memory cell MEM[i,j] (sink), and the current I[i+1,j] flows to the memory cell MEM[i+1,j] (sink); thus, the difference ΔI[j] in current flowing through the signal line B[j] from its initial value IOF[j] is as follows:

$$\Delta I[j] = (IC[j] - ICM - \sum I[i,j]) -$$

$$(IC[j] - ICM0 - \sum I0[i,j]) =$$

$$\sum IREF[i] - ICREF - \sum I[i,j] + ICREF -$$

$$\sum IREF0[i] + \sum I0[i,j] = \sum k(VPR + VW[i] - Vth)^2 -$$

$$\sum k(VPR - VX[i,j] + VW[i] - Vth)^2 - \sum k(VPR - Vth)^2 +$$

$$\sum k(VPR - VX[i,j] - Vth)^2 = 2k \sum (VW[i] \cdot VX[i,j]).$$

Formula (8)

Here, Σ (VW[i]·VX[i,j]) corresponds to the sum of products of the potential VX[i,j] corresponding to the first analog data and the potential VW[i] corresponding to the second analog data. That is, the product sum value of the first analog data and the second analog data can be calculated.

In the above derivation, it is understood that the current (discharge current) IC[j] and ICREF flowing through the transistor 132 and the transistor 136, respectively, may be different from each other as long as they are each constant. That is, the signal line FG[j], the signal line B[j+1], and the signal line FGREF are each set at independent voltage, and the transistors 132 and the transistor 136 can be each made function as a constant current source that supplies optimum constant current.

In the period from Time T09 to Time T10, when the potential of the signal line RW[i] is set at VW[i] and the potential of the signal line RW[i+1] is set at a reference potential, differential current ΔI[j]=2kΣ(VW[i]·VX[i,j]) =2k·VW[i]·VX[i,j] is output to the wiring B[j]. In other words, data corresponding to the product of the first analog data stored in the memory cell MEM[i,j] and the second analog data corresponding to the selection signal applied to the memory cell MEM[i,j] is output from the column output circuit OUT[j].

In the period from Time T11 to Time T12, when the potential of the signal line RW[i] is set at a reference potential and the potential of the signal line RW[i+1] is set at VW[i+1], differential current ΔI[j]=2kΣ(VW[i]·VX[i,j]) =2k·VW[i+1]·VX[i+1,j] is output to the wiring B[j]. In other words, data corresponding to the product of the first analog data stored in the memory cell MEM[i+1,j] and the second analog data corresponding to the selection signal applied to the memory cell MEM[i+1,j] is output from the column output circuit OUT[j].

In the period from Time T13 to Time T14, when the potential of the signal line RW[i] is set at VW[i] and the potential of the signal line RW[i+1] is set at VW[i+1], differential current ΔI[j]=2kΣ(VW[i]·VX[i,j])=2k·(VW[i] ·VX[i,j]+VW[i+1]·VX[i+1,j]) is output to the wiring B[j]. In other words, data corresponding to the sum of products of the first analog data, stored in the memory cells MEM[i,j] and MEM[i+1,j], and the second analog data, corresponding to the selection signals respectively applied to the memory cells MEM[i,j] and MEM[i+1,j], is output from the column output circuit OUT[j].

In the period from Time T09 to Time T14, potentials of the signal line B[j] and the signal line B[j+1] change by R·ΔI[j] and R·ΔI[j+1], i.e., by 2kRΣ(VW[i]·VX[i,j]) and kRΣ(VW[i]·VX[i,j+1]) in accordance with Formula (8), respectively, when the resistance value of the resistor 115 is R. Thus, when the capacitive coupling ratio of the capacitor 114 is CC, the potentials of the output signal line VO[i] and the output signal line VO[j+1] are VOPR[j]−Vtho+CC·kRΣ (VW[i]·VX[i,j]) and VOPR[j+1]−Vtho+CC·kRΣ(VW[i]·VX [i,j+1]), respectively, and the result of the product-sum operation based on the values of VOPR[j]−Vtho and VOPR [j+1]−Vtho being "0" is output. That is, through writing certain initial values to the retention node O[j] and the retention node O[j+1], the offset can be canceled to substantially zero.

The values of VOPR[j] and VOPR[j+1] can be adjusted within a range in which the transistor 112 operates as a source follower, and can be directly used as input signals of the circuit in the subsequent stage. In other words, offset canceling and current-voltage conversion can be performed at the same time.

In the APS 100 described in this embodiment, the output current of the memory cell MEM is converted into voltage as mentioned above, and is applied to the first terminal of the capacitor 114 included in the offset circuit 110. For the potential of the second terminal of the capacitor 114 (i.e., the node O), a certain initial value is written first, and then the node is brought into a floating state, whereby the offset of the initial value of the output current can be canceled. Thus, only difference from the initial value of the output current can be converted into voltage to be output.

With such a configuration, even when drain current of the transistor in the offset circuit is changed due to a change in drain voltage in the saturation region, a situation where the drain potential of the transistor in the offset circuit is changed by the potential written to each memory cell to cause difference in output current can be prevented.

Thus, when the input potential is a value indicating "0", i.e., when the input potential is a reference potential, the output can be a constant initial value regardless of the potential indicating the weight coefficient written to each memory cell. Accordingly, the product-sum operation can be performed with high accuracy.

Note that the APS 100 described in this embodiment is capable of product-sum operations and current-voltage conversion even though it includes almost the same number of elements as that in the APS 50 described earlier in Embodiment 3, and only the resistors are added therein. Accordingly, the area of the substrate required for the product-sum operation circuit is prevented from increasing, benefiting the productivity.

As described above, with the use of the analog product-sum operation circuit described in this embodiment, a semiconductor device capable of efficiently performing product-sum operations can be provided. Furthermore, a semiconductor device capable of executing product-sum operations with high accuracy can be provided.

Embodiment 5

In this embodiment, the details of the display panel 20 described in Embodiment 1 will be described.
<<Pixel Circuit>>

First, a circuit configuration that can be used for the pixel 14 in FIG. 3 will be described with reference to FIG. 19.

Figure 19A:
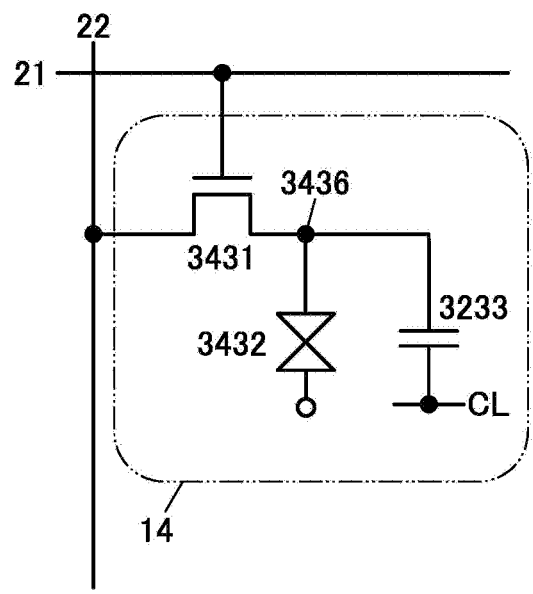
FIGS. 19A and 19B are circuit diagrams each illustrating a configuration example of a pixel.

The pixel 14 illustrated in FIG. 19(A) includes a transistor 3431, a capacitor 3233, and a liquid crystal element 3432.

One of a source electrode or a drain electrode of the transistor 3431 is electrically connected to the source line 22, and the other is electrically connected to a node 3436. A gate electrode of the transistor 3431 is electrically connected to the gate line 21. The transistor 3431 has the function of controlling writing of a data signal to the node 3436.

One of a pair of electrodes of the capacitor 3233 is electrically connected to a wiring to which a particular potential is supplied (hereinafter, also referred to as a "capacitor line CL"), and the other is electrically connected to the node 3436. The potential of the capacitor line CL is set according to the specifications of the pixel 14 as appropriate. The capacitor 3233 has the function of storing data written to the node 3436.

One of a pair of electrodes of the liquid crystal element 3432 is supplied with a common potential, and the other is electrically connected to the node 3436. The alignment state of liquid crystals contained in the liquid crystal element 3432 depends on the potential written to the node 3436.

As the mode of the liquid crystal element 3432, a TN mode, an STN mode, a VA mode, an ASM (Axially Symmetric Aligned Micro-cell) mode, an OCB (Optically Compensated Birefringence) mode, an FLC (Ferroelectric Liquid Crystal) mode, an AFLC (AntiFerroelectric Liquid Crystal) mode, an MVA mode, a PVA (Patterned Vertical Alignment) mode, an IPS mode, an FFS mode, a TBA (Transverse Bend Alignment) mode, or the like may be used, for example. The other examples of the mode include an ECB (Electrically Controlled Birefringence) mode, a PDLC (Polymer Dispersed Liquid Crystal) mode, a PNLC (Polymer Network Liquid Crystal) mode, and a guest-host mode. Note that various modes can be used, without limitation to the above.

Figure 19B:
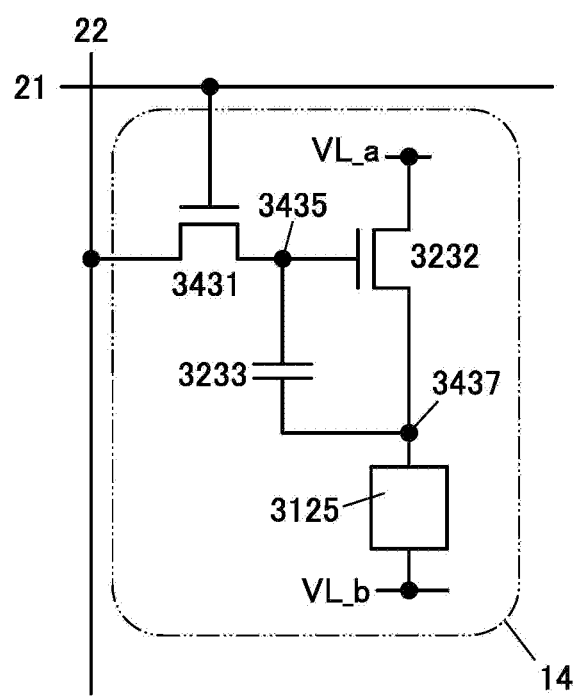

The pixel 14 illustrated in FIG. 19(B) includes the transistor 3431, the capacitor 3233, a transistor 3232, and a light-emitting element 3125.

One of the source electrode or the drain electrode of the transistor 3431 is electrically connected to the source line 22 to which data signal is supplied, and the other is electrically connected to a node 3435. The gate electrode of the transistor 3431 is electrically connected to the gate line 21 to which a gate signal is supplied. The transistor 3431 has the function of controlling writing of a data signal to the node 3435.

One of the pair of electrodes of the capacitor 3233 is electrically connected to the node 3435, and the other is electrically connected to a node 3437. The capacitor 3233 has the function of a storage capacitor for retaining data written to the node 3435.

One of a source electrode or a drain electrode of the transistor 3232 is electrically connected to a potential supply line VL_a, and the other is electrically connected to the node 3437. A gate electrode of the transistor 3232 is electrically connected to the node 3435. The transistor 3232 has the function of controlling current flowing through the light-emitting element 3125.

One of an anode or a cathode of the light-emitting element 3125 is electrically connected to a potential supply line VL_b, and the other is electrically connected to the node 3437.

As the light-emitting element 3125, an organic EL element or the like can be used, for example. Note that the light-emitting element 3125 is not limited thereto; an inorganic EL element formed of an inorganic material may be used, for example.

The potential supply line VL_a has the function of supplying VDD, for example. The potential supply line VL_b has the function of supplying VSS, for example.

<<Cross-Sectional View>>

Next, the structure examples of the display panel 20 will be described with reference to cross-sectional views in FIG. 20 and FIG. 21.

Figure 20A:
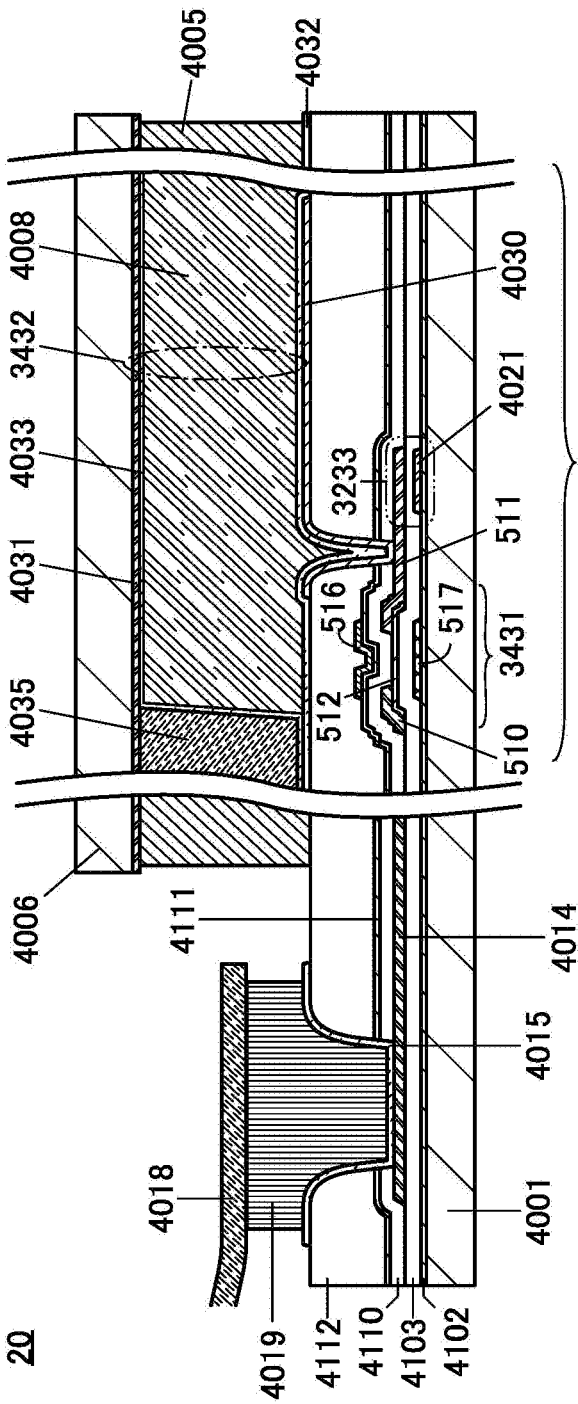
FIGS. 20A and 20B are cross-sectional views each illustrating a structure example of a display panel.
Figure 20B:
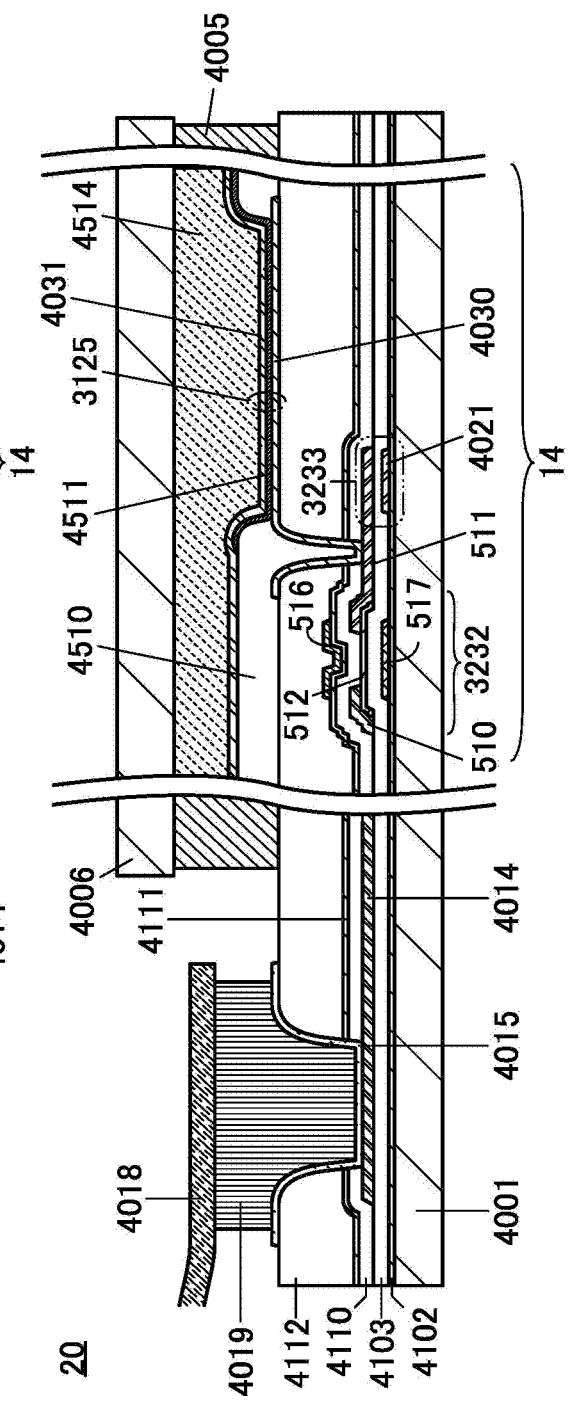

The display panels 20 illustrated in FIGS. 20(A) and 20(B) each include an electrode 4015, and the electrode 4015 is electrically connected to a terminal included in an FPC 4018 through an anisotropic conductive layer 4019. The electrode 4015 is electrically connected to a wiring 4014 in an opening formed in an insulating layer 4112, an insulating layer 4111, and an insulating layer 4110. The electrode 4015 is formed of the same conductive layer as a first electrode layer 4030.

The pixel 14 provided over a first substrate 4001 includes a transistor; FIG. 20(A) illustrates the transistor 3431 included in the pixel 14, and FIG. 20(B) illustrates the transistor 3232 included in the pixel 14, for example.

The transistors 3431 and 3232 are provided over an insulating layer 4102. The transistors 3431 and 3232 each include an electrode 517 formed over the insulating layer 4102, and an insulating layer 4103 is formed over the electrode 517. A semiconductor layer 512 is formed over the insulating layer 4103. An electrode 510 and an electrode 511 are formed over the semiconductor layer 512, the insulating layer 4110 and the insulating layer 4111 are formed over the electrode 510 and the electrode 511, and an electrode 516 is formed over the insulating layer 4110 and the insulating layer 4111. The electrode 510 and the electrode 511 are formed of the same conductive layer as the wiring 4014.

In each of the transistors 3431 and 3232, the electrode 517 has the function of a gate electrode, the electrode 510 has the function of one of a source electrode or a drain electrode, the electrode 511 has the function of the other of the source electrode or the drain electrode, and the electrode 516 has the function of a back gate electrode.

The transistors 3431 and 3232 each have a bottom gate structure and include a back gate, thereby capable of increasing on-state current. Moreover, the threshold voltage of the transistors can be controlled. Note that the electrode 516 may be omitted in some cases to simplify the manufacturing process.

In each of the transistors 3431 and 3232, the semiconductor layer 512 has the function of a channel formation region. As the semiconductor layer 512, crystalline silicon, polycrystalline silicon, amorphous silicon, a metal oxide, an organic semiconductor, or the like may be used. Impurities may be introduced to the semiconductor layer 512, if necessary, to increase the conductivity of the semiconductor layer 512 or to control the threshold voltage of the transistors.

In the case where a metal oxide is used as the semiconductor layer 512, the semiconductor layer 512 preferably contains indium (In). In the case where the semiconductor layer 512 is a metal oxide containing indium, the carrier mobility (electron mobility) of the semiconductor layer 512 improves. In addition, the semiconductor layer 512 is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a plurality of the elements described above may be combined as the element M. The element M is an element having high bonding energy with oxygen, for example. The element M is an element having higher bonding energy with oxygen than indium, for example. Furthermore, the semiconductor layer 512 is preferably a metal oxide containing zinc (Zn). A metal oxide containing zinc is easily crystallized in some cases.

The semiconductor layer 512 is not limited to a metal oxide containing indium. The semiconductor layer 512 may be, for example, a metal oxide that does not contain indium and contains zinc, a metal oxide that does not contain indium and contains gallium, or a metal oxide that does not contain indium and contains tin, e.g., zinc tin oxide or gallium tin oxide.

The display panels 20 illustrated in FIGS. 20(A) and 20(B) each include the capacitor 3233. The capacitor 3233 has a region in which the electrode 511 overlaps with an electrode 4021 with the insulating layer 4103 positioned therebetween. The electrode 4021 is formed of the same conductive layer as the electrode 517.

FIG. 20(A) is an example of a liquid crystal display panel using a liquid crystal element as a display element. In FIG. 20(A), the liquid crystal element 3432 which is a display element includes the first electrode layer 4030, a second electrode layer 4031, and a liquid crystal layer 4008. Note that an insulating layer 4032 and an insulating layer 4033 functioning as alignment films are provided so that the liquid crystal layer 4008 is sandwiched therebetween. The second electrode layer 4031 is provided on the second substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided in order to control the distance (a cell gap) between the first electrode layer 4030 and the second electrode layer 4031. Note that a spherical spacer may alternatively be used.

In the case where a liquid crystal element is used as the display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

The specific resistivity of a liquid crystal material is greater than or equal to $1\times10^9$ $\Omega\cdot$cm, preferably greater than or equal to $1\times10^{11}$ $\Omega\cdot$cm, more preferably greater than or equal to $1\times10^{12}$ $\Omega\cdot$cm. Note that a value of the specific resistivity in this specification is a value measured at 20° C.

In the case where an OS transistor is used as the transistor 3431, the transistor 3431 can have a small current value in an off state (off-state current value). Accordingly, the retention time of an electrical signal such as an image signal can be made longer, and a writing interval can also be set longer in an on state. Thus, the frequency of refresh operations can be reduced, resulting in an effect of reducing power consumption.

In the display panel, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a side light, or the like may be used as a light source.

FIG. 20(B) illustrates an example of a display panel using, as a display element, a light-emitting element such as an EL element. EL elements are classified into organic EL elements and inorganic EL elements.

In an organic EL element, by voltage application, electrons and holes are injected to an EL layer from one of electrodes and the other of the electrodes, respectively. Then, as the carriers (electrons and holes) are recombined, a light-emitting organic compound forms an excited state, and light is emitted when the excited state returns to a ground state. Owing to such a mechanism, this light-emitting element is referred to as a current-excitation light-emitting element. Note that the EL layer may further include a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), or the like, in addition to the light-emitting compound. The EL layer can be formed by an evaporation method (including a vacuum evaporation method), a transfer method, a printing method, an inkjet method, a coating method, or the like.

Inorganic EL elements are classified according to their element structures into a dispersion-type inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure in which a light-emitting layer is sandwiched between dielectric layers, which are further sandwiched between electrodes, and its light emission mechanism is localized type light emission that utilizes inner-shell electron transition of metal ions.

FIG. 20(B) illustrates an example in which an organic EL element is used as the light-emitting element 3125.

In FIG. 20(B), the light-emitting element 3125 is electrically connected to the transistor 3232 provided in the pixel 14. Note that the structure of the light-emitting element 3125 is a stacked-layer structure including the first electrode layer 4030, a light-emitting layer 4511, and the second electrode layer 4031; however, the structure is not limited thereto. The structure of the light-emitting element 3125 can be changed as appropriate according to the direction in which light is extracted from the light-emitting element 3125, or the like.

A partition wall 4510 is formed using an organic insulating material or an inorganic insulating material. It is particularly preferable that a photosensitive resin material be used and an opening be formed over the first electrode layer 4030 so that the side surface of the opening becomes an inclined surface having continuous curvature.

The light-emitting layer 4511 may be formed using a single layer or a plurality of layers that are stacked.

A protective layer may be formed over the second electrode layer 4031 and the partition wall 4510 in order to prevent entry of oxygen, hydrogen, moisture, carbon dioxide, or the like into the light-emitting element 3125. As the protective layer, silicon nitride, silicon nitride oxide, aluminum oxide, aluminum nitride, aluminum oxynitride, aluminum nitride oxide, DLC (Diamond Like Carbon), or the like can be formed. In addition, in a space that is enclosed by the first substrate 4001, the second substrate 4006, and a sealant 4005, a filler 4514 is provided for sealing. In this way, packaging (sealing) is preferably performed using a protective film (such as a laminate film or an ultraviolet curable resin film) or a cover member with high air-tightness and little degasification so that the light-emitting element is not exposed to the outside air.

As the filler 4514, an ultraviolet curable resin or a thermosetting resin as well as an inert gas such as nitrogen or argon can be used; for example, PVC (polyvinyl chloride), an acrylic resin, polyimide, an epoxy resin, a silicone resin, PVB (polyvinyl butyral), EVA (ethylene vinyl acetate), or the like can be used. In addition, a drying agent may be contained in the filler 4514.

For the sealant 4005, a glass material such as a glass frit or a resin material such as a light curable resin, a thermosetting resin, or a cured resin which is curable at room temperature such as a two-component-mixture-type resin can be used. In addition, a drying agent may be contained in the sealant 4005.

Furthermore, if needed, an optical film such as a polarizing plate, a circularly polarizing plate (including an elliptically polarizing plate), a retardation plate (a quarter-wave plate or a half-wave plate), or a color filter may be provided as appropriate on a light-emitting surface of the light-emitting element. In addition, the polarizing plate or the circularly polarizing plate may be provided with an anti-reflection film. Anti-glare treatment by which reflected light can be diffused by projections and depressions on the surface to reduce the glare can be performed, for example.

When the light-emitting element has a microcavity structure, light with high color purity can be extracted. Furthermore, when a microcavity structure and a color filter are used in combination, the glare can be reduced and visibility of a display image can be increased.

For the first electrode layer 4030 and the second electrode layer 4031, a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added can be used.

The first electrode layer 4030 and the second electrode layer 4031 can also be formed using one or more kinds selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; or metal nitrides thereof.

The first electrode layer 4030 and the second electrode layer 4031 can also be formed using a conductive composition containing a conductive high molecule (also referred to as a conductive polymer). As the conductive high molecule, what we call π-electron conjugated conductive high molecule can be used. For example, polyaniline or a derivative thereof, polypyrrole or a derivative thereof, polythiophene or a derivative thereof, and a copolymer of two or more of aniline, pyrrole, and thiophene or a derivative thereof can be given.

In order for the light-emitting element 3125 to extract light outside, at least one of the first electrode layer 4030 or the second electrode layer 4031 is transparent. According to how the light is extracted, the structures of the display panels are classified into a top emission structure, a bottom emission structure, and a dual emission structure. The top emission structure refers to the case where light is extracted through the substrate 4006. The bottom emission structure refers to the case where light is extracted through the substrate 4001. The dual emission structure refers to the case where light is extracted through both the substrate 4006 and the substrate 4001. In the case of the top emission structure, for example, the second electrode layer 4031 is made transparent. In the case of the bottom emission structure, for example, the first electrode layer 4030 is made transparent. In the case of the dual emission structure, for example, the first electrode layer 4030 and the second electrode layer 4031 are made transparent.

<Substrate 4001>

A material having heat resistance high enough to withstand heat treatment in the manufacturing process can be used for the substrate 4001 or the like. For example, a material with a thickness less than or equal to 0.7 mm and greater than or equal to 0.1 mm can be used for the substrate 4001. Specifically, a material polished to a thickness of approximately 0.1 mm can be used.

A large-sized glass substrate of the 6th generation (1500 mm×1850 mm), the 7th generation (1870 mm×2200 mm), the 8th generation (2200 mm×2400 mm), the 9th generation (2400 mm×2800 mm), the 10th generation (2950 mm×3400 mm), or the like can be used for the substrate 4001 or the like, for example. Thus, a large-sized display device can be manufactured.

An organic material, an inorganic material, a composite material of an organic material and an inorganic material or the like, or the like can be used for the substrate 4001 or the like. For example, an inorganic material such as glass, ceramics, or metal can be used for the substrate 4001 or the like.

Specifically, non-alkali glass, soda-lime glass, potash glass, crystal glass, aluminosilicate glass, tempered glass, chemically tempered glass, quartz, sapphire, or the like can be used for the substrate 4001 or the like. Specifically, an inorganic oxide film, an inorganic nitride film, an inorganic oxynitride film, or the like can be used for the substrate 4001 or the like. For example, a silicon oxide film, a silicon nitride film, a silicon oxynitride film, an aluminum oxide film, or the like can be used for the substrate 4001 or the like. Stainless steel, aluminum, or the like can be used for the substrate 4001 or the like.

A single crystal semiconductor substrate made of silicon or silicon carbide, a polycrystalline semiconductor substrate, a compound semiconductor substrate of silicon germanium or the like, an SOI substrate, or the like can be used for the substrate 4001 or the like, for example. Thus, a semiconductor element can be formed over the substrate 4001 or the like.

An organic material such as a resin, a resin film, or plastic can be used for the substrate 4001 or the like, for example. Specifically, a resin film or a resin plate of polyester, polyolefin, polyamide, polyimide, polycarbonate, an acrylic resin, or the like can be used for the substrate 4001 or the like, for example.

A composite material formed by attaching a metal plate, a thin glass plate, or a film of an inorganic material or the like to a resin film or the like can be used for the substrate 4001 or the like, for example. A composite material formed by dispersing a fibrous or particulate metal, glass, an inorganic material, or the like into a resin film can be used for the substrate 4001 or the like, for example. A composite material formed by dispersing a fibrous or particulate resin, an organic material, or the like into an inorganic material can be used for the substrate 4001 or the like, for example.

Furthermore, a single-layer material or a material in which a plurality of layers are stacked can be used for the substrate 4001 or the like. For example, a material in which a base, an insulating film that prevents diffusion of impurities contained in the base, and the like are stacked can be used for the substrate 4001 or the like. Specifically, a material in which glass and one or a plurality of films selected from a silicon oxide layer, a silicon nitride layer, a silicon oxynitride layer, and the like and that prevent diffusion of impurities contained in the glass are stacked can be used for the substrate 4001 or the like. Alternatively, a material in which a resin and a silicon oxide film, a silicon nitride film, a silicon oxynitride film, or the like that prevents diffusion of impurities that penetrate the resin are stacked can be used for the substrate 4001 or the like.

Specifically, a resin film, a resin plate, a layered material, or the like of polyester, polyolefin, polyamide, polyimide, polycarbonate, an acrylic resin, or the like can be used for the substrate 4001 or the like.

Specifically, a material containing polyester, polyolefin, polyamide (nylon, aramid, or the like), polyimide, polycarbonate, polyurethane, an acrylic resin, an epoxy resin, or a resin having a siloxane bond, such as silicone, can be used for the substrate 4001 or the like.

Specifically, polyethylene terephthalate (PET), polyethylene naphthalate (PEN), polyethersulfone (PES), acrylic resin, or the like can be used for the substrate 4001 or the like. A cyclo olefin polymer (COP), a cyclo olefin copolymer (COC), or the like can also be used.

Paper, wood, or the like can also be used for the substrate 4001 or the like.

A substrate having flexibility can be used for the substrate 4001 or the like, for example.

Note that a method in which a transistor, a capacitor, or the like is directly formed on the substrate can be used. A method in which a transistor, a capacitor, or the like is formed on a substrate which is for use in the manufacturing process and has heat resistance to heat applied in the manufacturing process, and then the formed transistor, capacitor, or the like is transferred to the substrate 4001 or the like can be used. In this way, a transistor, a capacitor, or the like can be formed over a substrate having flexibility, for example.

<Substrate 4006>

A material that can be used for the substrate 4001, for example, can be used for the substrate 4006. A light-transmitting material selected from the materials that can be used for the substrate 4001 can be used for the substrate 4006, for example. A material that has a surface on which an antireflective film with a thickness of 1 μm or less is formed can also be used for the substrate 4006. Specifically, a material in which three or more, preferably five or more, more preferably 15 or more dielectrics are stacked can be used for the substrate 4006. This allows reflectivity to be as low as 0.5% or less, preferably 0.08% or less. A material with lowered birefringence selected from the materials that can be used for the substrate 4001 can also be used for the substrate 4006.

Aluminosilicate glass, tempered glass, chemically tempered glass, sapphire, or the like, for example, can be suitable for the substrate 4006 that is provided on the side close to a user of the display panel. Thus, damage or a crack of the display panel caused by the use thereof can be prevented.

A resin film of a cyclic olefin polymer (COP), a cyclic olefin copolymer (COC), triacetyl cellulose (TAC), or the like, for example, can be suitable for the substrate 4006. This can reduce the weight. Also, occurrence frequency of damage caused by dropping or the like can be reduced.

A material with a thickness less than or equal to 0.7 mm and greater than or equal to 0.1 mm, for example, can be used for the substrate 4006. Specifically, a substrate polished for reducing the thickness can be used.

FIG. 21(A) shows a cross-sectional view of the case where a top-gate transistor is provided as the transistor 3431 shown in FIG. 20(A). Similarly, FIG. 21(B) shows a cross-sectional view of the case where a top-gate transistor is provided as the transistor 3232 shown in FIG. 20(B).

In each of the transistors 3431 and 3232 in FIGS. 21(A) and 21(B), an electrode 517 has the function of a gate electrode, an electrode 510 has the function of one of a source electrode or a drain electrode, and an electrode 511 has the function of the other of the source electrode or the drain electrode.

For the details of other components in FIGS. 21(A) and 21(B), refer to the description for FIGS. 20(A) and 20(B).

Unless otherwise specified, on-state current in this specification refers to drain current of a transistor in an on state. Unless otherwise specified, the on state (abbreviated as "on" in some case) of an n-channel transistor means that the voltage (VG) between its gate and source is higher than or equal to the threshold voltage (Vth), and the on state of a p-channel transistor means that VG is lower than or equal to Vth. For example, the on-state current of an n-channel transistor refers to drain current that flows when VG is higher than or equal to Vth. Furthermore, the on-state current of a transistor depends on voltage between a drain and a source (VD) in some cases.

Unless otherwise specified, off-state current in this specification refers to drain current of a transistor in an off state. Unless otherwise specified, the off state (abbreviated as "off" in some cases) of an n-channel transistor means that VG is lower than Vth, and the off state of a p-channel transistor means that VG is higher than Vth. For example, the off-state current of an n-channel transistor refers to drain current that flows when VG is lower than Vth. The off-state current of a transistor depends on VG in some cases. Thus, "the off-state current of a transistor is lower than $10^{-21}$ A" may mean that there is VG at which the off-state current of the transistor is lower than $10^{-21}$ A.

Furthermore, the off-state current of a transistor depends on VD in some cases. Unless otherwise specified, the off-state current in this specification may be off-state current at VD with an absolute value of 0.1 V, 0.8 V, 1 V, 1.2 V, 1.8 V, 2.5 V, 3 V, 3.3 V, 10 V, 12 V, 16 V, or 20 V. Alternatively, the off-state current may be off-state current at VD used in a semiconductor device or the like including the transistor.

In this specification and the like, one of a source and a drain is denoted as "one of a source or a drain" (or a first electrode or a first terminal) and the other of the source and the drain is denoted as "the other of the source or the drain" (or a second electrode or a second terminal) in the description of the connection relation of a transistor. This is because the source and the drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, when there is an explicit description "X and Y are connected," the case where X and Y are electrically connected and the case where X and Y are directly connected are regarded as being disclosed in this specification and the like.

Here, X and Y each denote an object (e.g., a device, an element, a circuit, a wiring, an electrode, a terminal, a conductive film, or a layer).

An example of the case where X and Y are directly connected to each other is the case where X and Y are connected to each other without an element that enables an electrical connection between X and Y (e.g., a switch, a transistor, a capacitor, an inductor, a resistor, a diode, a display element, a light-emitting element, or a load).

As an example of the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that a switch has the function of determining whether current flows or not by being turning on or off (becoming an on state or an off state). Alternatively, the switch has the function of selecting and changing a current path. Note that the case where X and Y are electrically connected includes the case where X and Y are directly connected.

Example 1

In this example, the OS-APS that is described in Embodiment 3 was fabricated over a glass substrate. In addition, multiplication characteristics of the OS-APS that is described in Embodiment 4 were simulated.

Figure 22A:
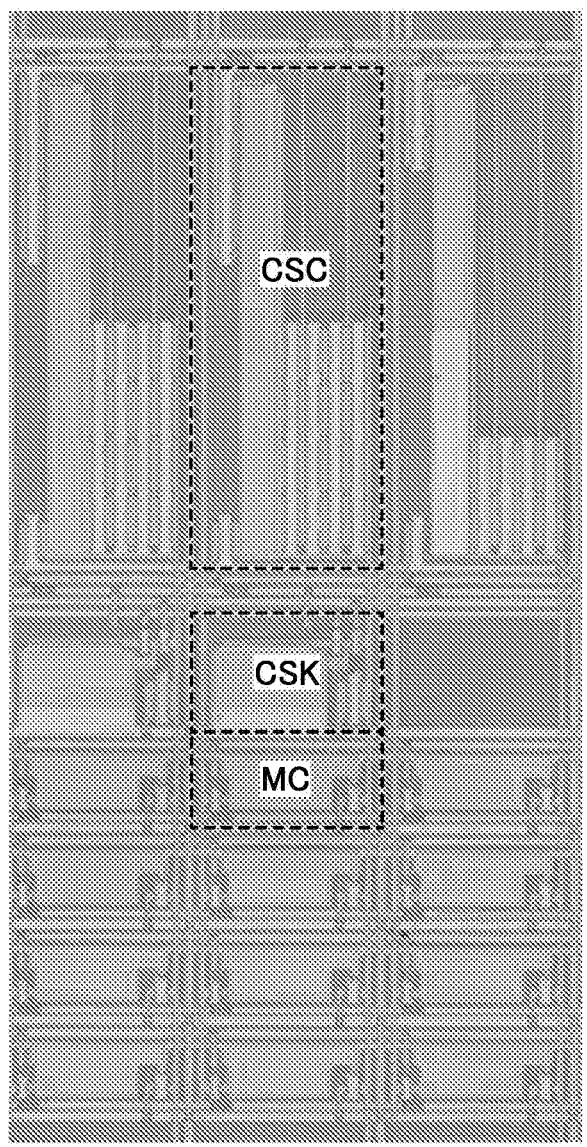
FIGS. 22A and 22B are optical micrographs of the OS-APS chip fabricated as a prototype in Example 1.
Figure 22B:
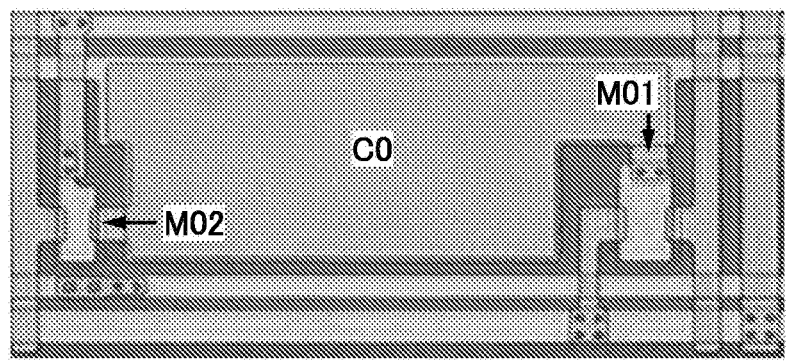

Optical micrographs of the prototype OS-APS chip are shown in FIG. 22. FIG. 22(A) is a photograph of the whole OS-APS, and FIG. 22(B) is an enlarged photograph of the memory cell MC part.

FIG. 22(A) shows portions corresponding to the circuit CSC, the circuit CSK, and the memory cell MC in FIG. 12.

FIG. 22(B) shows portions corresponding to the transistor M01, the transistor M02, and the capacitor C0 in the memory cell MC.

Figure 23:
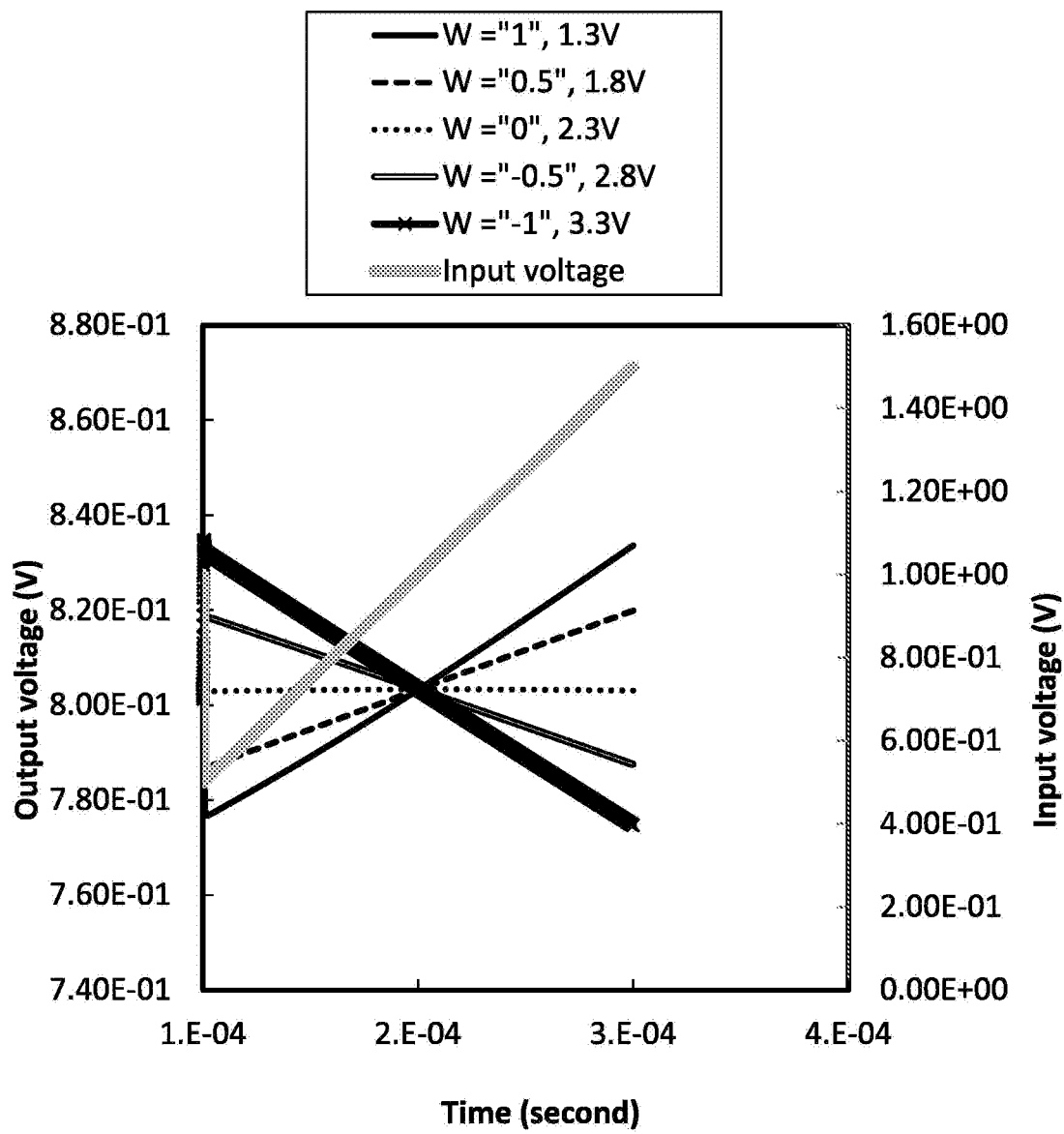
FIG. 23 is multiplication characteristics of the OS-APS chip fabricated as a prototype in Example 1.
Figure 24:
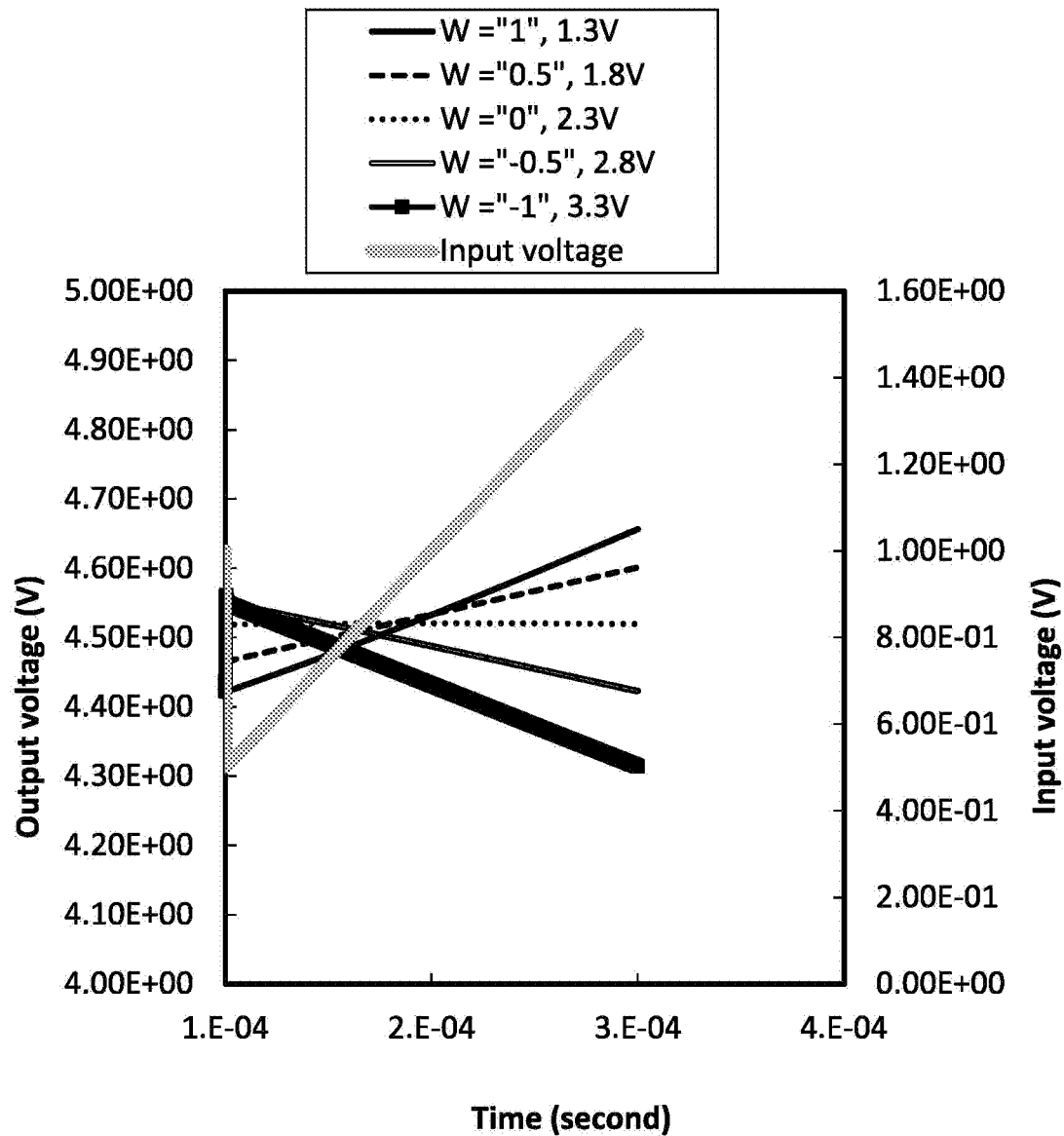
FIG. 24 is multiplication characteristics of the OS-APS chip fabricated as a prototype in Example 1.

FIG. 23 and FIG. 24 show simulation results of the multiplication characteristics of one memory cell MC in the OS-APS described in Embodiment 4. FIG. 23 shows results of the case where an offset circuit is included as in one embodiment of the present invention. FIG. 24 shows results of the case where an offset circuit in not included, as a comparative example.

The multiplication characteristics were calculated by changing the input voltage according to time. In each of FIG. 23 and FIG. 24, the horizontal axis represents time (second), and the vertical axis represents output voltage (V). As for the weight coefficient "W", 1.3 V, 1.8 V, 2.3 V, 2.8 V, and 3.3 V were applied for W="1", W="0.5", W="0", W="−0.5", and W="−1", respectively. When multiplications in the OS-APS are ideally performed, straight lines of the multiplication results of weight coefficients cross at one point where the product corresponds to "0".

In the case where the offset circuit is included as in FIG. 23, the straight lines of the multiplication results of weight coefficients crossed at one point. By contrast, in the case where the offset circuit is not included as in FIG. 24, the point where the product corresponds to "0" varies depending on the weight coefficient, and the lines did not cross at one point.

Next, a neural network was formed with the prototype OS-APS in FIG. 22 and simulations of performing learning and inference therewith were executed.

First, learning of the image data ("1", "2", "3", and "4") each with 36 (=6×6) pixels shown in FIG. 25(A) was performed.

Then, images in each of which 10% noise was added to the image data of FIG. 25(A) were prepared (FIG. 25(B)), and inference with respect to the images was performed. For any of "1", "2", "3", and "4", the image was recognized correctly, with an accuracy of 95% or higher.

As described above, it was confirmed that a neural network can be formed and image recognition through machine learning can be achieved with the use of the OS-APS of one embodiment of the present invention.

Example 2

In this example, a display device using a flexible touch panel that can be folded in three was fabricated, and its ability to recognize characters through the use of a neural network was demonstrated.

The flexible touch panel was fabricated as follows. First, a separation layer (a tungsten film) was formed over one formation substrate (a glass substrate), and a layer to be separated including a transistor and a light-emitting element was formed over the separation layer. In addition, a separation layer was formed over the other formation substrate, and a layer to be separated including electrodes of a touch sensor using a conductive oxide film and a color filter was formed over the separation layer. Then, after the two formation substrates were bonded to each other with an adhesive layer, each of the formation substrates was separated from the layer to be separated, and flexible substrates were attached instead, with an adhesive; whereby the flexible touch panel was fabricated.

As the light-emitting element, a top-emission organic EL element was used.

A crystalline metal oxide containing In, Ga, and Zn was used for a semiconductor layer in which a channel of the transistor was formed.

Figure 26:
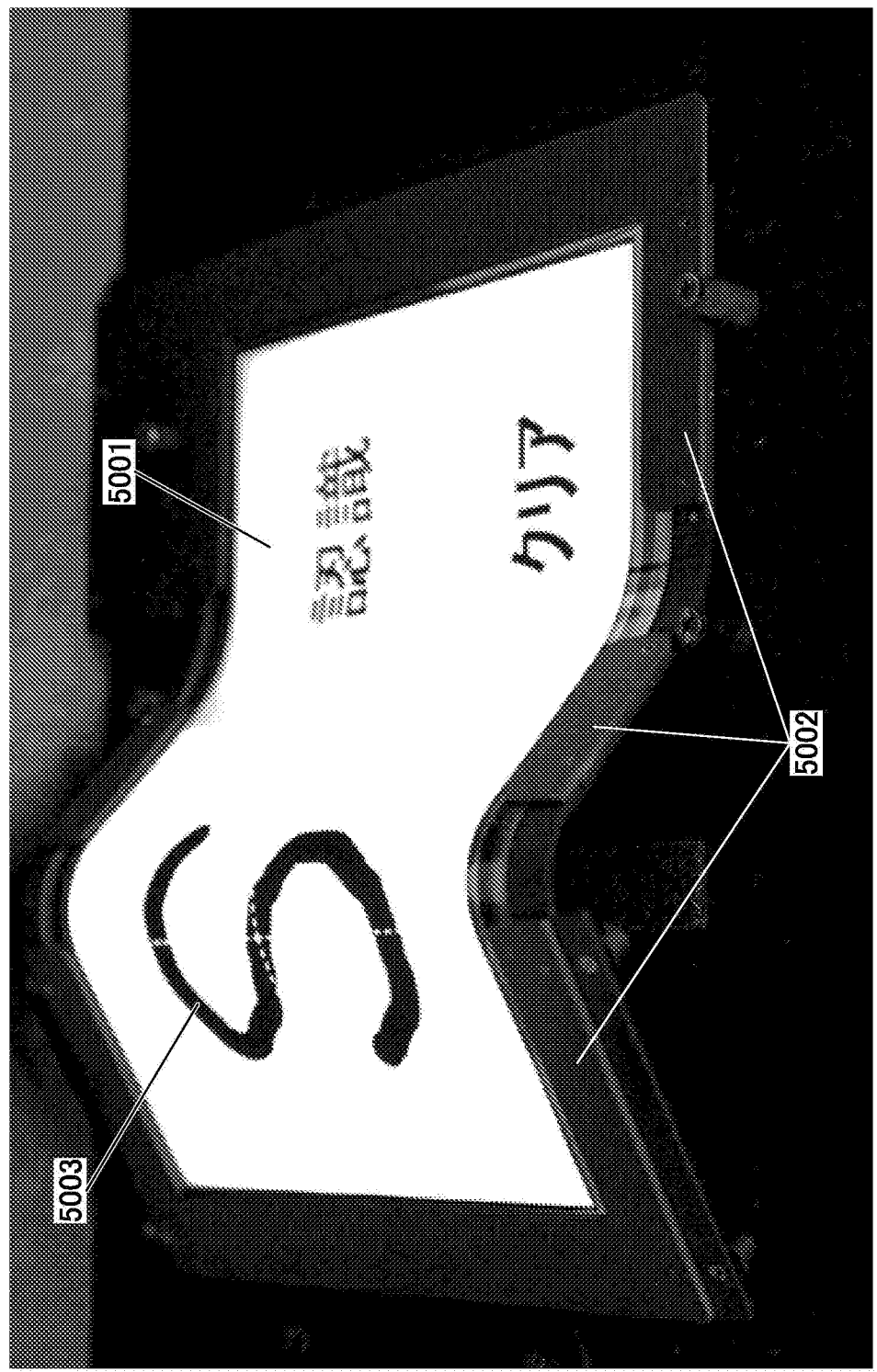
FIG. 26 is a photograph of a display device fabricated as a prototype in Example 2.

The fabricated display device is shown in FIG. 26. The display device has a structure in which a flexible touch panel 5001 is held by three housings 5002. FIG. 26 shows a state where the display surface of the flexible touch panel 5001 is curved such that both a convex surface portion and a concave surface portion are included.

In FIG. 26, a character 5003, which is "S", input by handwriting is clearly shown.

In this example, whether or not the character input to the flexible touch panel by handwriting can be recognized through the use of the neural network was verified. Here, touch signals output from the flexible touch panel were input to a computer, and character recognition was performed using a learning model of the neural network in which learning had been performed in advance. As a result, it was confirmed that character recognition can be performed without any problem even for a handwritten character input to the flexible touch panel.

DESCRIPTION OF NUMERALS 1 information terminal
1a information terminal
2 display portion
2a display portion
3a housing
3b housing
3c housing
4 hinge
5 server
10 touch panel system
11 pixel portion 12 gate driver
13 source driver
14 pixel
15 touch sensor
16 sensing circuit
19 NN circuit
20 display panel
21 gate line
22 source line
25 host
31 input layer
32 intermediate layer
33 output layer
41_1 neuron
41_2 neuron
41_3 neuron
42_1 neuron
42_2 neuron
42_3 neuron
43_1 neuron
43_2 neuron
43_3 neuron
50 APS
51 memory cell array
52 circuit
53 circuit
54 circuit
60 image-receiving device
61 display portion
62 input region
63 region
64 antenna
65 Internet connection
66 server
70 touch panel system
72 encoder
73 image-processing circuit
74 decoder
75 analog front end
76 receiving circuit
77 decoder
81 upper cover
82 FPC
83 FPC
84 FPC
87 back light unit
88 light source
89 frame
90 printed circuit board
91 battery
92 lower cover
100 APS
110 offset circuit
111 transistor
112 transistor
113 transistor
114 capacitor
115 resistor
120 memory cell array
123 transistor
124 transistor
125 capacitor
130 current source circuit
131a constant current circuit
131b constant current circuit
132 transistor
133 transistor
134 transistor
135 capacitor
136 transistor
137 transistor
138 transistor
139 capacitor
140 transistor
141 transistor
510 electrode
511 electrode
512 semiconductor layer
516 electrode
517 electrode
3125 light-emitting element
3232 transistor
3233 capacitor
3431 transistor
3432 liquid crystal element
3435 node
3436 node
3437 node
4001 substrate
4005 sealant
4006 substrate
4008 liquid crystal layer
4014 wiring
4015 electrode
4018 FPC
4019 anisotropic conductive layer
4021 electrode
4030 electrode layer
4031 electrode layer
4032 insulating layer
4033 insulating layer
4035 spacer
4102 insulating layer
4103 insulating layer
4110 insulating layer
4111 insulating layer
4112 insulating layer
4510 partition wall
4511 light-emitting layer
4514 filler
5001 flexible touch panel
5002 housing
5003 handwritten character

What is claimed is:

1. An electronic device comprising:
a pixel portion comprising a pixel;
a neural network circuit electrically connected to the pixel portion; and
a touch sensor electrically connected to the pixel portion,
wherein the neural network circuit comprises a first transistor and a second transistor,
wherein the first transistor comprises silicon in a channel formation region, and
wherein the second transistor comprises an oxide semiconductor in a channel formation region.

2. The electronic device according to claim 1,
wherein the neural network circuit comprises a synapse, and
wherein the synapse comprises the first transistor and the second transistor.

3. The electronic device according to claim 1,
wherein the neural network circuit is configured to analyze a pattern of an image information obtained by the touch sensor, and to convert the image information into character information.

4. The electronic device according to claim 1, wherein the oxide semiconductor comprises indium, gallium, and zinc.

5. The electronic device according to claim 1, wherein the pixel comprises a liquid crystal element or a light-emitting element.

6. An electronic device comprising:
a pixel portion comprising a pixel;
a neural network circuit electrically connected to the pixel portion; and
a touch sensor electrically connected to the pixel portion,
wherein the neural network circuit comprises a first transistor and a second transistor,
wherein the first transistor comprises silicon in a channel formation region,
wherein the second transistor comprises an oxide semiconductor in a channel formation region, and
wherein the second transistor is stacked over the first transistor.

7. The electronic device according to claim 6,
wherein the neural network circuit comprises a synapse, and
wherein the synapse comprises the first transistor and the second transistor.

8. The electronic device according to claim 6,
wherein the neural network circuit is configured to analyze a pattern of an image information obtained by the touch sensor, and to convert the image information into character information.

9. The electronic device according to claim 6, wherein the oxide semiconductor comprises indium, gallium, and zinc.

10. The electronic device according to claim 6, wherein the pixel comprises a liquid crystal element or a light-emitting element.

* * * * *